US011290989B2

(12) United States Patent
Li et al.

(10) Patent No.: US 11,290,989 B2
(45) Date of Patent: Mar. 29, 2022

(54) INFORMATION TRANSMISSION METHOD AND APPARATUS

(71) Applicant: HUAWEI TECHNOLOGIES CO., LTD., Guangdong (CN)

(72) Inventors: Xueru Li, Beijing (CN); Ruiqi Zhang, Beijing (CN); Hao Sun, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 62 days.

(21) Appl. No.: 16/719,286

(22) Filed: Dec. 18, 2019

(65) Prior Publication Data

US 2020/0128533 A1 Apr. 23, 2020

Related U.S. Application Data

(63) Continuation of application No. PCT/CN2018/115878, filed on Nov. 16, 2018.

(30) Foreign Application Priority Data

Nov. 17, 2017 (CN) .............................. 201711148322

(51) Int. Cl.
*H04W 72/04* (2009.01)
*H04L 1/00* (2006.01)
*H04L 5/00* (2006.01)
*H04L 5/10* (2006.01)
*H04W 24/10* (2009.01)

(52) U.S. Cl.
CPC ....... *H04W 72/0413* (2013.01); *H04L 1/0026* (2013.01); *H04L 5/0007* (2013.01);
(Continued)

(58) Field of Classification Search
CPC ............. H04W 72/0413; H04W 24/10; H04W 72/042; H04L 1/0026; H04L 5/0007;
(Continued)

(56) References Cited

U.S. PATENT DOCUMENTS

2014/0092832 A1 4/2014 Han et al.
2015/0003390 A1 1/2015 Cheng et al.
(Continued)

FOREIGN PATENT DOCUMENTS

CN 101978642 A 2/2011
CN 103312446 A 9/2013
(Continued)

*Primary Examiner* — Dady Chery
(74) *Attorney, Agent, or Firm* — Womble Bond Dickinson (US) LLP

(57) ABSTRACT

This application provides an information transmission method and apparatus. The method includes: receiving, by a terminal device, a plurality of pieces of downlink control information DCI, where each of the plurality of pieces of DCI is used to trigger reporting of one piece of UCI and indicate a physical uplink control channel PUCCH resource carrying the UCI, the UCI includes at least one piece of channel state information CSI and response information, and PUCCH resources indicated by the plurality of pieces of downlink DCI occupy at least one same orthogonal frequency division multiplexing OFDM symbol; and sending, by the terminal device, target UCI on a target PUCCH resource, where the target UCI includes UCI triggered by the plurality of pieces of DCI, and the target PUCCH resource is one of the PUCCH resources indicated by the plurality of pieces of DCI. In this way, aperiodic CSI triggered by DCI can be transmitted on a PUCCH resource.

20 Claims, 8 Drawing Sheets

(52) U.S. Cl.
CPC .............. *H04L 5/0051* (2013.01); *H04L 5/10* (2013.01); *H04W 24/10* (2013.01); *H04W 72/042* (2013.01)

(58) Field of Classification Search
CPC ..... H04L 5/0051; H04L 5/10; H04L 27/2602; H04L 27/261; H04L 5/0085; H04L 5/0048; H04L 27/26; H04L 5/0057; H04L 5/0091
See application file for complete search history.

(56) References Cited

U.S. PATENT DOCUMENTS

| | | | |
|---|---|---|---|
| 2015/0208404 A1 | 7/2015 | Yie et al. | |
| 2016/0174211 A1 | 6/2016 | Gao et al. | |
| 2016/0219618 A1 | 7/2016 | Rico Alvarino et al. | |
| 2018/0027549 A1* | 1/2018 | Wang | H04L 5/0044 370/329 |
| 2018/0262307 A1* | 9/2018 | Shimezawa | H04L 5/0094 |
| 2020/0343954 A1* | 10/2020 | Takeda | H04W 72/042 |
| 2020/0367244 A1* | 11/2020 | Yang | H04W 72/02 |

FOREIGN PATENT DOCUMENTS

| | | |
|---|---|---|
| CN | 104348589 A | 2/2015 |
| CN | 106211345 A | 12/2016 |
| CN | 107210893 A | 9/2017 |
| WO | 2007078171 A3 | 10/2008 |
| WO | 2015010604 A1 | 1/2015 |

\* cited by examiner

| A/N0 | A/N1 | CSI |

| 0 bit | A/N1 | 0-bit sequence |

| A/N0 | CSI | 0-bit sequence |

INFORMATION TRANSMISSION METHOD AND APPARATUS

CROSS-REFERENCE TO RELATED APPLICATIONS

This application is a continuation of International Application No. PCT/CN2018/115878, filed on Nov. 16, 2018, which claims priority to Chinese Patent Application No. 201711148322.0, filed on Nov. 17, 2017. The disclosures of the aforementioned applications are hereby incorporated by reference in their entireties.

TECHNICAL FIELD

This application relates to the field of communications technologies, and in particular, to an information transmission method and apparatus.

BACKGROUND

In a long term evolution (LTE) system, uplink control information (UCI) is transmitted on a physical uplink control channel (PUCCH). The UCI may be channel state information (CSI) or response information (acknowledgement/negative acknowledgement (ACK/NACK, A/N for short below)) fed back for scheduling of a downlink data packet. The CSI is obtained by a terminal device by measuring a reference signal, and is used to determine information such as an appropriate modulation and coding scheme and a precoding matrix by a network device for a subsequently scheduled downlink data packet, to improve efficiency and reliability of transmitting the downlink data packet. The A/N is obtained by the terminal device by detecting the downlink data packet. If the terminal device correctly receives the downlink data packet, the terminal device feeds back an ACK, and if the terminal device fails to correctly receive the downlink data packet, the terminal device feeds back a NACK. The downlink data packet is scheduled by using downlink control information (DCI) sent by the network device to the terminal device. The DCI further indicates a PUCCH resource for the terminal device to feed back a corresponding A/N. A 5th generation mobile communications (5G) system supports that a plurality of pieces of DCI sent by the network device at a plurality of moments indicate a same PUCCH resource at a same moment, where the same PUCCH resource is used to report all A/Ns corresponding to the repeated scheduling of the downlink data packet. Because DCI may be missed, the DCI indicates a quantity of bits of the A/N that needs to be fed back by the terminal device until current scheduling. For example, the network device sends DCI0 at a moment n, and sends DCI1 at a moment n+1. DCI0 indicates a quantity Z1 of bits of A/N0 that needs to be reported by the terminal device in a first PUCCH resource at a moment n+k, and DCI1 indicates a quantity Z2 of bits of A/N1 that needs to be reported by the terminal device in the first PUCCH resource at the moment n+k, where Z2>Z1, to ensure that each A/N reported a current time is not misplaced.

In LTE, periodic CSI can be transmitted on a PUCCH resource. When the periodic CSI and the A/N need to be transmitted at a same moment, because a quantity of bits that can be carried by the PUCCH resource is limited, in an existing transmission mechanism, the terminal device discards periodic CSI that occupies a relatively large quantity of bits and reports only the A/N, to ensure that the PUCCH resource can accommodate a quantity of bits that need to be reported.

In the 5G system, aperiodic CSI may also be transmitted on a PUCCH resource. The aperiodic CSI is triggered by DCI, and the PUCCH resource is also allocated by the DCI that triggers the CSI. When the aperiodic CSI and the A/N are transmitted at a same moment, according to the existing transmission mechanism, the aperiodic CSI is discarded. Because the aperiodic CSI is usually triggered by the network device when necessary, if the aperiodic CSI is discarded, performance of subsequent downlink data transmission is impaired, and system performance is impaired

SUMMARY

This application provides an information transmission method and apparatus, to resolve a problem that aperiodic CSI cannot be transmitted on a PUCCH resource.

According to a first aspect, this application provides an information transmission method, including:

receiving, by a terminal device, a plurality of pieces of DCI, where each of the plurality of pieces of DCI is used to trigger reporting of one piece of UCI and indicate a PUCCH resource carrying the UCI, the UCI includes at least one piece of channel state information CSI and response information, and PUCCH resources indicated by the plurality of pieces of downlink DCI occupy at least one identical orthogonal frequency division multiplexing (OFDM) symbol; and sending, by the terminal device, target UCI on a target PUCCH resource, where the target UCI includes UCI triggered by the plurality of pieces of DCI, and the target PUCCH resource is one of the PUCCH resources indicated by the plurality of pieces of DCI.

In the information transmission method provided by the first aspect, after receiving the plurality of pieces of DCI sent by a network device, the terminal device determines the target PUCCH resource from the PUCCH resources indicated by the plurality of pieces of DCI, and then sends the target UCI to the network device on the target PUCCH resource. The target UCI includes the UCI triggered by the plurality of pieces of DCI. The UCI triggered by each piece of DCI includes at least one piece of the CSI and the response information. The CSI may be aperiodic CSI or semi-persistent CSI. The network device receives the target UCI on the target PUCCH resource, so that the aperiodic CSI triggered by the DCI can be transmitted on the PUCCH resource.

In one embodiment, the PUCCH resources indicated by the plurality of pieces of DCI are a same PUCCH resource, and the sending, by the terminal device, target UCI on a target PUCCH resource includes:

sending, by the terminal device, the target UCI and indication information on the target PUCCH resource, where the indication information is used to indicate a type of the target UCI, the type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In the information transmission method provided in this embodiment, when the terminal device sends the UCI, the indication information indicates whether the UCI includes the CSI, and when the UCI includes the CSI, an information bit sequence of the UCI is formed in a bit sequence mapping manner that CSI is in front of an A/N. After receiving the UCI and the indication information, the network device may determine the type of the UCI based on the indication information, to correctly interpret the UCI based on the type of the UCI and the corresponding information bit sequence. In this way, a problem that all content is incorrectly interpreted because the terminal device misses the DCI that triggers the aperiodic CSI can be avoided.

In one embodiment, the method further includes: determining, by the terminal device, the type of the target UCI based on the plurality of pieces of DCI; and determining the type of the target UCI as the first type if one of the plurality of pieces of DCI triggers CSI reporting, and/or determining the type of the target UCI as the second type if none of the plurality of pieces of DCI triggers CSI reporting.

In one embodiment, the sending, by the terminal device, the target UCI and indication information on the target PUCCH resource includes: sending, by the terminal device, a first information bit sequence on the target PUCCH resource, where a bit in at least one preset position in the first information bit sequence is determined based on the indication information, and the first information bit sequence further includes an information bit sequence of the target UCI.

In this embodiment, the indication information is carried in the first information bit sequence in an explicit carrying manner.

In one embodiment, the sending, by the terminal device, the target UCI and indication information on the target PUCCH resource includes: determining, by the terminal device, a sequence of a demodulation reference signal DMRS of the target PUCCH resource, where the sequence of the DMRS is determined based on a first sequence and a second sequence, the first sequence is determined based on the indication information, and the second sequence is determined based on configuration information received by the terminal device.

In this embodiment, the indication information is carried in the sequence of the DMRS of the target PUCCH resource in an implicit carrying manner. As compared with the explicit carrying manner, in the implicit carrying manner, a channel coding gain can be obtained when the UCI does not include the CSI.

In one embodiment, at least two of the PUCCH resources indicated by the plurality of pieces of DCI are different PUCCH resources, and the sending, by the terminal device, target UCI on a target PUCCH resource includes: determining, by the terminal device, the target PUCCH resource in the at least two different PUCCH resources according to a preset rule, and sending, by the terminal device, the target UCI on the target PUCCH resource.

In one embodiment, the target PUCCH resource is a PUCCH resource that can carry the largest quantity of encoded bits of the at least two different PUCCH resources; or, the target PUCCH resource is a PUCCH resource indicated by the last DCI of the plurality of pieces of DCI received by the terminal device before the terminal device sends the target UCI; or, the target PUCCH resource is one of PUCCH resources for carrying UCI that includes CSI.

In the information transmission method provided in this embodiment, when the terminal device sends the target UCI, the indication information indicates whether the UCI includes the CSI, and when the UCI includes the CSI, an information bit sequence of the UCI is formed in a bit sequence mapping manner that CSI is in front of an A/N. After receiving the UCI and the indication information, the network device may determine the type of the UCI based on the indication information, to correctly interpret the UCI based on the type of the UCI and the corresponding information bit sequence. In this way, a problem that all content is incorrectly interpreted because the terminal device misses the DCI that triggers the aperiodic CSI can be avoided.

In one embodiment, the PUCCH resources indicated by the plurality of pieces of DCI are PUCCH resources in PUCCH resources configured by first configuration information.

In one embodiment, the PUCCH resources configured by the first configuration information include at least one first PUCCH resource for carrying UCI that includes CSI and at least one second PUCCH resource for carrying UCI that does not include CSI, and the PUCCH resources indicated by the plurality of pieces of DCI include at least one first PUCCH resource and/or at least one second PUCCH resource.

In one embodiment, the CSI is aperiodic CSI or semi-persistent CSI.

In one embodiment, the sending, by the terminal device, target UCI on a target PUCCH resource includes:

determining, by the terminal device, the information bit sequence $a_0, \ldots, a_{A-1}$ of the target UCI, where if the target UCI includes CSI and response information, a bit sequence $a_{B_1}, \ldots, a_{B_2}$ in $a_0, \ldots, a_{A-1}$ is an information bit sequence of the CSI, $a_{C_1}, \ldots, a_{C_2}$ is an information bit sequence of the response information, A is a length of the information bit sequence of the target UCI, $A > C2 > C1 > B2 > B1 \geq 0$, and A, B1, B2, C1, and C2 are integers; and sending, by the terminal device, the information bit sequence on the target PUCCH resource.

According to a second aspect, this application provides an information transmission method, including:

sending, by a network device, a plurality of pieces of downlink control information DCI, where each of the plurality of pieces of DCI is used to trigger reporting of one piece of UCI and indicate a physical uplink control channel PUCCH resource carrying the UCI, the UCI includes at least one piece of channel state information CSI and response information, and PUCCH resources indicated by the plurality of pieces of downlink DCI occupy at least one same orthogonal frequency division multiplexing OFDM symbol; and receiving, by the network device, target UCI on a target PUCCH resource, where the target PUCCH resource is one of the PUCCH resources indicated by the plurality of pieces of DCI, and the target UCI includes UCI triggered by all or some of the plurality of pieces of DCI.

In the information transmission method provided by the second aspect, after receiving the plurality of pieces of DCI sent by a network device, the terminal device determines the target PUCCH resource from the PUCCH resources indicated by the plurality of pieces of DCI, and then sends the target UCI to the network device on the target PUCCH resource. The target UCI includes the UCI triggered by the plurality of pieces of DCI. The UCI triggered by each piece of DCI includes at least one piece of the CSI and the response information. The CSI may be aperiodic CSI or semi-persistent CSI. The network device receives the target UCI on the target PUCCH resource, so that the aperiodic CSI triggered by the DCI can be transmitted on the PUCCH resource.

In one embodiment, the PUCCH resources indicated by the plurality of pieces of DCI are an identical PUCCH resource, and the receiving, by the network device, target UCI on a target PUCCH resource includes:

receiving, by the network device, the target UCI and indication information on the target PUCCH resource, where the indication information is used to indicate a type of the target UCI, the type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In the information transmission method provided in this embodiment, when the terminal device sends the UCI, the indication information indicates whether the UCI includes the CSI, and when the UCI includes the CSI, an information bit sequence of the UCI is formed in a bit sequence mapping manner that CSI is in front of an A/N. After receiving the UCI and the indication information, the network device may determine the type of the UCI based on the indication information, to correctly interpret the UCI based on the type of the UCI and the corresponding information bit sequence. In this way, a problem that all content is incorrectly interpreted because the terminal device misses the DCI that triggers the aperiodic CSI can be avoided.

In one embodiment, the receiving, by the network device, the target UCI and indication information on the target PUCCH resource includes: receiving, by the network device, a first information bit sequence on the target PUCCH resource, where the indication information is determined based on a bit in at least one preset position in the first information bit sequence, and the first information bit sequence further includes an information bit sequence of the target UCI.

In this embodiment, the indication information is carried in the first information bit sequence in an explicit carrying manner.

In one embodiment, the receiving, by the network device, the target UCI and indication information on the target PUCCH resource includes: receiving, by the network device, a demodulation reference signal DMRS of the target PUCCH resource, and determining the indication information based on a sequence of the DMRS, where the sequence of the DMRS is determined based on a first sequence and a second sequence, the first sequence is determined based on the indication information, and the second sequence is determined based on configuration information sent by the network device.

In this embodiment, the indication information is carried in the sequence of the DMRS of the target PUCCH resource in an implicit carrying manner. As compared with the explicit carrying manner, in the implicit carrying manner, a channel coding gain can be obtained when the UCI does not include the CSI.

In one embodiment, at least two of the PUCCH resources indicated by the plurality of pieces of DCI are different PUCCH resources, and the method further includes: determining, by the network device, the target PUCCH resource in the at least two different PUCCH resources, and determining a type of the target UCI based on the target PUCCH resource, where the type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In one embodiment, the determining, by the network device, a type of the target UCI based on the target PUCCH resource includes: determining the type of the target UCI as the first type if UCI triggered by DCI that indicates the target PUCCH resource includes CSI; and/or determining the type of the target UCI as the second type if UCI triggered by DCI that indicates the target PUCCH resource does not include CSI.

In the information transmission method provided in this implementation, when the terminal device sends the target UCI, the indication information indicates whether the UCI includes the CSI, and when the UCI includes the CSI, an information bit sequence of the UCI is formed in a bit sequence mapping manner that CSI is in front of an A/N. After receiving the UCI and the indication information, the network device may determine the type of the UCI based on the indication information, to correctly interpret the UCI based on the type of the UCI and the corresponding information bit sequence. In this way, a problem that all content is incorrectly interpreted because the terminal device misses the DCI that triggers the aperiodic CSI can be avoided.

In one embodiment, the PUCCH resources indicated by the plurality of pieces of DCI are PUCCH resources in PUCCH resources configured by first configuration information.

In one embodiment, the PUCCH resources configured by the first configuration information include at least one first PUCCH resource for carrying UCI that includes CSI and at least one second PUCCH resource for carrying UCI that does not include CSI, and the PUCCH resources indicated by the plurality of pieces of DCI include at least one first PUCCH resource and/or at least one second PUCCH resource.

In one embodiment, the CSI is aperiodic CSI or semi-persistent CSI.

In one embodiment, the receiving, by the network device, target UCI on a target PUCCH resource includes:

determining, by the network device, the information bit sequence $a_0, \ldots, a_{A-1}$ of the UCI, where if the type of the target UCI is the first type, a bit sequence $a_{B_1}, \ldots, a_{B_2}$ in the information bit sequence $a_0, \ldots, a_{A-1}$ is an information bit sequence of the CSI, $a_{C_1}, \ldots, a_{C_2}$ is an information bit sequence of the response information, A is a length of the information bit sequence of the target UCI, $A > C2 > C1 > B2 > B1 \geq 0$, and A, B1, B2, C1, and C2 are integers.

According to a third aspect, this application provides a terminal device, including:

a receiving module, configured to receive a plurality of pieces of downlink control information DCI, where each of the plurality of pieces of DCI is used to trigger reporting of one piece of UCI and indicate a physical uplink control channel PUCCH resource carrying the UCI, the UCI includes at least one piece of channel state information CSI and response information, and PUCCH resources indicated by the plurality of pieces of downlink DCI occupy at least one same orthogonal frequency division multiplexing OFDM symbol; and a sending module, configured to send target UCI on a target PUCCH resource, where the target UCI includes UCI triggered by the plurality of pieces of DCI, and the target PUCCH resource is one of the PUCCH resources indicated by the plurality of pieces of DCI.

In one embodiment, the PUCCH resources indicated by the plurality of pieces of DCI are a same PUCCH resource, and the sending module is configured to send the target UCI and indication information on the target PUCCH resource, where the indication information is used to indicate a type of the target UCI, the type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In one embodiment, the terminal device further includes a determining module, configured to: determine the type of the target UCI based on the plurality of pieces of DCI; and determine the type of the target UCI as the first type if one of the plurality of pieces of DCI triggers CSI reporting, and/or determine the type of the target UCI as the second type if none of the plurality of pieces of DCI triggers CSI reporting.

In one embodiment, the sending module is configured to send a first information bit sequence on the target PUCCH resource, where a bit in at least one preset position in the first information bit sequence is determined based on the indication information, and the first information bit sequence further includes an information bit sequence of the target UCI.

In one embodiment, the sending module is configured to determine a sequence of a demodulation reference signal DMRS of the target PUCCH resource, where the sequence of the DMRS is determined based on a first sequence and a second sequence, the first sequence is determined based on the indication information, and the second sequence is determined based on configuration information received by the terminal device.

In one embodiment, at least two of the PUCCH resources indicated by the plurality of pieces of DCI are different PUCCH resources, and the sending module is configured to: determine the target PUCCH resource in the at least two different PUCCH resources according to a preset rule, and send the target UCI on the target PUCCH resource.

In one embodiment, the target PUCCH resource is a PUCCH resource that can carry the largest quantity of encoded bits of the at least two different PUCCH resources; or, the target PUCCH resource is a PUCCH resource indicated by the last DCI of the plurality of pieces of DCI received by the terminal device before the terminal device sends the target UCI; or, the target PUCCH resource is one of PUCCH resources for carrying UCI that includes CSI.

In one embodiment, the PUCCH resources indicated by the plurality of pieces of DCI are PUCCH resources in PUCCH resources configured by first configuration information.

In one embodiment, the PUCCH resources configured by the first configuration information include at least one first PUCCH resource for carrying UCI that includes CSI and at least one second PUCCH resource for carrying UCI that does not include CSI, and the PUCCH resources indicated by the plurality of pieces of DCI include at least one first PUCCH resource and/or at least one second PUCCH resource.

In one embodiment, the CSI is aperiodic CSI or semi-persistent CSI.

In one embodiment, the sending module is configured to:
determine the information bit sequence $a_0, \ldots, a_{A-1}$ of the target UCI, where if the target UCI includes CSI and response information, a bit sequence $a_{B_1}, \ldots, a_{B_2}$ in $a_0, \ldots, a_{A-1}$ is an information bit sequence of the CSI, $a_{C_1}, \ldots, a_{C_2}$ is an information bit sequence of the response information, A is a length of the information bit sequence of the target UCI, $A > C2 > C1 > B2 > B1 \geq 0$, and A, B1, B2, C1, and C2 are integers; and send the information bit sequence on the target PUCCH resource.

Refer to beneficial effects brought by the foregoing first aspect and the possible implementations of the first aspect for beneficial effects of the terminal device provided in the foregoing third aspect and the possible designs of the third aspect. Details are not described herein again.

According to a fourth aspect, this application provides a network device, including:
a sending module, configured to send a plurality of pieces of downlink control information DCI, where each of the plurality of pieces of DCI is used to trigger reporting of one piece of UCI and indicate a physical uplink control channel PUCCH resource carrying the UCI, the UCI includes at least one piece of channel state information CSI and response information, and PUCCH resources indicated by the plurality of pieces of downlink DCI occupy at least one same orthogonal frequency division multiplexing OFDM symbol; and a receiving module, configured to receive target UCI on a target PUCCH resource, where the target PUCCH resource is one of the PUCCH resources indicated by the plurality of pieces of DCI, and the target UCI includes UCI triggered by all or some of the plurality of pieces of DCI.

In one embodiment, the PUCCH resources indicated by the plurality of pieces of DCI are a same PUCCH resource, and the receiving module is configured to receive the target UCI and indication information on the target PUCCH resource, where the indication information is used to indicate a type of the target UCI, the type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In one embodiment, the receiving module is configured to receive a first information bit sequence on the target PUCCH resource, where the indication information is determined based on a bit in at least one preset position in the first information bit sequence, and the first information bit sequence further includes an information bit sequence of the target UCI.

In one embodiment, the receiving module is configured to: receive a demodulation reference signal DMRS of the target PUCCH resource, and determine the indication information based on a sequence of the DMRS, where the sequence of the DMRS is determined based on a first sequence and a second sequence, the first sequence is determined based on the indication information, and the second sequence is determined based on configuration information sent by the network device.

In one embodiment, at least two of the PUCCH resources indicated by the plurality of pieces of DCI are different PUCCH resources, and the network device further includes:
a determining module, configured to: determine the target PUCCH resource in the at least two different PUCCH resources, and determine a type of the target UCI based on the target PUCCH resource, where the type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In one embodiment, the determining module is configured to: determine the type of the target UCI as the first type if UCI triggered by DCI that indicates the target PUCCH resource includes CSI, and/or determine the type of the target UCI as the second type if UCI triggered by DCI that indicates the target PUCCH resource does not include CSI.

In one embodiment, the PUCCH resources indicated by the plurality of pieces of DCI are PUCCH resources in PUCCH resources configured by first configuration information.

In one embodiment, the PUCCH resources configured by the first configuration information include at least one first PUCCH resource for carrying UCI that includes CSI and at least one second PUCCH resource for carrying UCI that does not include CSI, and the PUCCH resources indicated by the plurality of pieces of DCI include at least one first PUCCH resource and/or at least one second PUCCH resource.

In one embodiment, the CSI is aperiodic CSI or semi-persistent CSI.

In one embodiment, the receiving module is configured to determine the information bit sequence $a_0, \ldots, a_{A-1}$ of the UCI, where if the type of the target UCI is the first type, a bit sequence $a_{B_1}, \ldots, a_{B_2}$ in the information bit sequence $a_0, \ldots, a_{A-1}$ is an information bit sequence of the CSI, $a_{C_1}, \ldots, a_{C_2}$ is an information bit sequence of the response information, A is a length of the information bit sequence of the target UCI, A>C2>C1>B2>B1≥0, and A, B1, B2, C1, and C2 are integers.

Refer to beneficial effects brought by the foregoing second aspect and the possible implementations of the second aspect for beneficial effects of the network device provided in the foregoing fourth aspect and the possible designs of the fourth aspect. Details are not described herein again.

According to a fifth aspect, this application provides a terminal device, including a memory and a processor, where the memory is configured to store a program instruction; and the processor is configured to invoke the program instruction in the memory to perform the information transmission method in the first aspect and any possible design of the first aspect.

According to a sixth aspect, this application provides a network device, including a memory and a processor, where the memory is configured to store a program instruction; and the processor is configured to invoke the program instruction in the memory to perform the information transmission method in the second aspect and any possible design of the second aspect.

According to a seventh aspect, this application provides a readable storage medium. The readable storage medium stores an execution instruction. When at least one processor of a terminal device executes the execution instruction, the terminal device performs the information transmission method in the first aspect and any possible design of the first aspect.

According to an eighth aspect, this application provides a readable storage medium. The readable storage medium stores an execution instruction. When at least one processor of a network device executes the execution instruction, the network device performs the information transmission method in the second aspect and any possible design of the second aspect.

According to a ninth aspect, this application provides a program product. The program product includes an execution instruction. The execution instruction is stored in a readable storage medium. At least one processor of a terminal device may read the execution instruction from the readable storage medium. The at least one processor executes the execution instruction, so that the terminal device implements the information transmission method in the first aspect and any possible design of the first aspect.

According to a tenth aspect, this application provides a program product. The program product includes an execution instruction. The execution instruction is stored in a readable storage medium. At least one processor of a network device may read the execution instruction from the readable storage medium. The at least one processor executes the execution instruction, so that the network device implements the information transmission method in the second aspect and any possible design of the second aspect.

According to an eleventh aspect, this application provides a chip. The chip is connected to a memory, or the memory is integrated on the chip. When a software program stored in the memory is executed, any one of the foregoing information transmission methods is implemented.

DESCRIPTION OF EMBODIMENTS

Figures 1, 2, 3, 4:
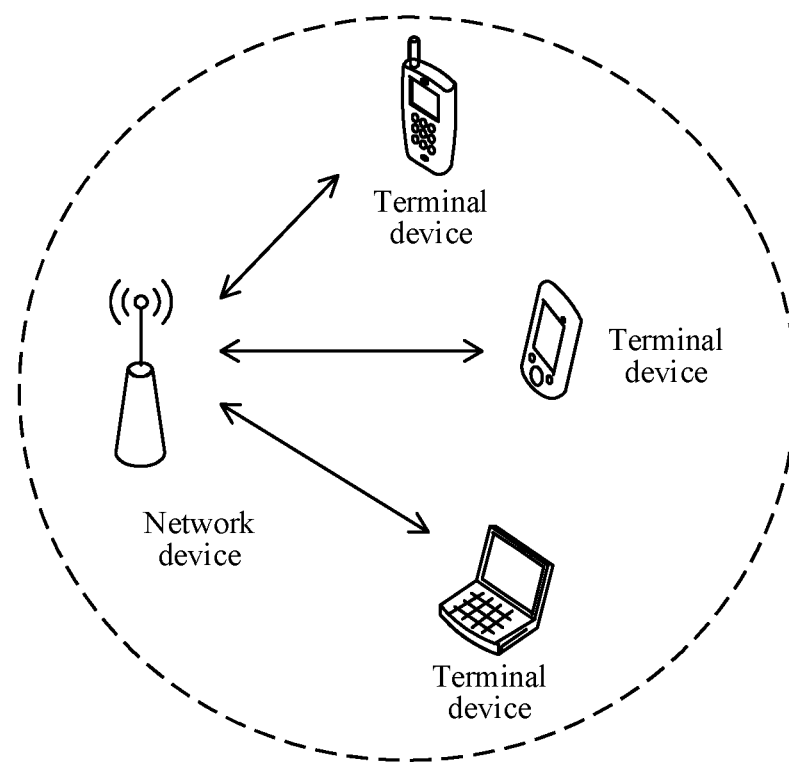
FIG. 1 is a schematic architectural diagram of a communications system.
FIG. 2 is a schematic diagram of a to-be-coded information bit sequence formed by a terminal device.
FIG. 3 is a schematic diagram of a to-be-coded information bit sequence formed by a terminal device when DCI0 is missed.
FIG. 4 is a schematic diagram of a to-be-coded information bit sequence formed by a terminal device when DCI1 is missed.

Embodiments of this application may be applied to a wireless communications system. It should be noted that the wireless communications system mentioned in the embodiments of this application includes but is not limited to: a narrowband Internet of Things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronization code division multiple access (TD-SCDMA) system, an LTE system, and a 5G system.

Communications apparatuses involved in this application mainly include a network device and a terminal device.

The network device may be a base station, an access point, an access network device, or a device that communications with a wireless terminal by using one or more sectors on an air interface in an access network. The network device may be configured to mutually convert a received over-the-air frame and an IP packet and serve as a router between the wireless terminal and the remaining part of the access network, where the remaining part of the access network may include an internet protocol (IP) network. The network device may coordinate attribute management of the air interface. For example, the network device may be a base transceiver station (BTS) in global system for mobile communications (GSM) or code division multiple access (CDMA), or a NodeB (NB) in WCDMA, or an evolved NodeB (eNB or eNodeB) in long term evolution (LTE), or a relay station or an access point, or a base station in a future 5G network such as a gNB. This is not limited herein. It should be noted that, for a 5G system or an NR system, in an NR base station, there may be one or more transmission reception points (TRP). All TRPs belong to a same cell. Each TRP and a terminal may use the measurement reporting method in the embodiments of this application. In another scenario, the network device may also include a control unit (CU) and a data unit (DU). In one CU, there may be a plurality of DUs. The measurement reporting method in the embodiments of this application may be used for both a terminal device and each DU. A difference between a CU-DU split scenario and a multi-TRP scenario lies in that: A TRP is merely a radio frequency unit or an antenna device, and a protocol stack function may be implemented on a DU. For example, a physical layer function may be implemented on the DU.

A terminal device may be a wireless terminal or a wired terminal. The wireless terminal may refer to a device that provides a user with voice and/or other service data connectivity, a handheld device with a radio connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable mobile apparatus, a pocket-sized mobile apparatus, a handheld mobile apparatus, a computer built-in mobile apparatus, or an in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent, a user device. This application is not limited thereto.

In the embodiments of this application, "a plurality of" refers to "two" or "more than two". The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

FIG. 1 is a schematic architectural diagram of a communications system. As shown in FIG. 1, the communications system of this application may include a network device and a terminal device. The network device communicates with the terminal device.

In related technologies, in a 5G system, aperiodic CSI triggered by DCI may also be transmitted on a PUCCH resource. According to an original transmission mechanism, the aperiodic CSI is discarded. The aperiodic CSI is usually triggered by the network device when necessary. Therefore, if the aperiodic CSI is discarded, performance of subsequent downlink data transmission is impaired, and system performance is impaired. To resolve this problem, this application provides an information transmission method, to transmit, on a PUCCH resource, aperiodic CSI triggered by DCI, thereby preventing system performance from being impaired.

In this application, based on the resolution of transmission, on a PUCCH resource, of aperiodic CSI triggered by DCI, further, when the aperiodic CSI is transmitted, the aperiodic CSI is triggered by the DCI, and the PUCCH resource is also allocated by the DCI that triggers the CSI. For example, DCI0 triggers the aperiodic CSI and downlink data packet scheduling, and after DCI0, DCI1 triggers downlink data scheduling for the second time, and DCI0 and DCI1 indicate that CSI, A/N0, and A/N1 are reported by using a same PUCCH resource at a moment n+2. According to the prior art, the terminal device may determine, based on the used PUCCH resource and according to a predefined rule, a length K of an information bit sequence of the UCI when the UCI is transmitted by using the PUCCH resource, where K is a positive integer. Then, the terminal device forms an information bit sequence in a mapping manner that an information bit sequence of an A/N is in front of an information bit sequence of CSI, and determines, based on a comparison between a length X of the information bit sequence and K, whether to pad K−X dummy bits behind the sequence, so that a length of a to-be-coded information bit sequence reaches K. Then, the terminal device performs operations such as coding and modulation on the to-be-coded information bit sequence with the length of K, and then adds the information bit sequence to the PUCCH resource for reporting to the network device. In this manner, FIG. 2 is a schematic diagram of the to-be-coded information bit sequence formed by the terminal device. In FIG. 2, it is assumed that the length K is exactly equal to X. Certainly, K may be alternatively greater than X, provided that the terminal device pads dummy bits in predefined positions. After performing operations such as demodulation and channel decoding, the network device obtains the information bit sequence with the length of K, and sequentially obtains A/N0, A/N1, and CSI based on a sequence in FIG. 2.

However, if the terminal device misses DCI0, the terminal device does not know that the CSI needs to be fed back. The terminal device can learn of, only according to an indication of DCI1, a quantity of bits of an A/N that needs to be fed back at the moment n+2, and pad a 0 bit in positions corresponding to A/N0. The padded 0 bit and an information bit of A/N1 form an information bit sequence that is of the A/N and that is with a total length of Y. In the foregoing manner, if determining that the length of the to-be-coded information bit sequence of the UCI is still K in this case, the terminal device pads K−Y dummy bits behind the information bit sequence of the A/N, so that the length of the to-be-coded information bit sequence reaches K. FIG. 3 is a schematic diagram of the to-be-coded information bit sequence formed by the terminal device when DCI0 is missed. However, the network device does not know that the terminal device misses DCI0, and interprets the obtained information bit sequence still in a manner that the terminal device reports the CSI (as shown in FIG. 2). In this case, if the network device uses the padded dummy bits as the CSI, performance of subsequent data transmission is significantly impaired. If the terminal device misses DCI1, the terminal device only knows that A/N0 and the CSI need to be reported. FIG. 4 is a schematic diagram of a to-be-coded information bit sequence formed by the terminal device when DCI1 is missed. As shown in FIG. 4, the terminal device forms the information bit sequence shown in FIG. 4, but the network device does not know that the terminal device misses DCI1. Therefore, the network device misinterprets the first bit of the CSI as A/N1, and interprets a subsequent bit as the CSI, resulting in errors in interpreting both the CSI and A/N1. Therefore, in an existing CSI sending manner, provided that DCI is missed, an error in interpreting information by the network device is caused. To resolve this problem, this application provides an information transmission method, to correct the error in interpreting information by the network device because the DCI is missed. Technical solutions of this application are described in detail below with reference to the accompanying drawings.

Figure 5:
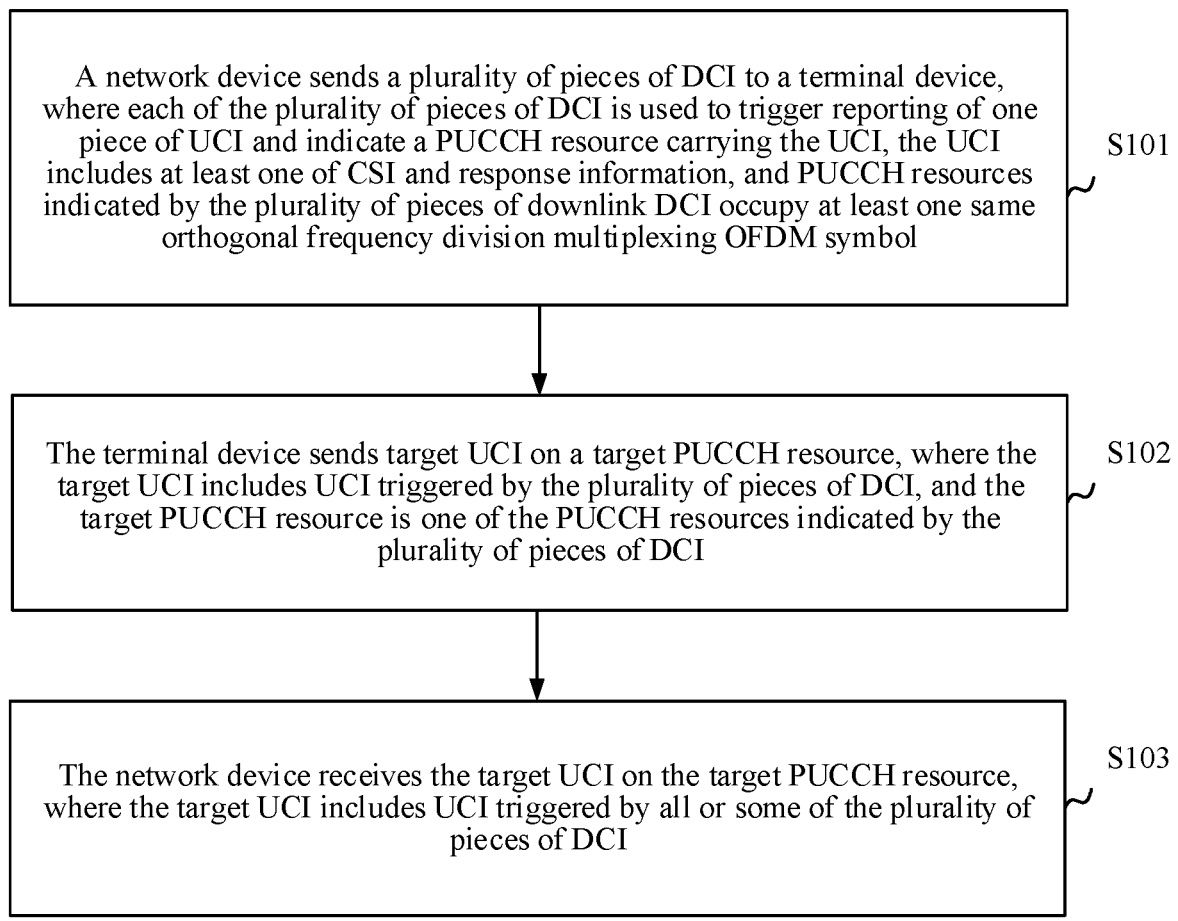
FIG. 5 is a flowchart of an embodiment of an information transmission method according to this application.

FIG. 5 is a flowchart of an embodiment of an information transmission method according to this application. As shown in FIG. 5, the method of this embodiment may include the following operations.

Operation S101: A network device sends a plurality of pieces of DCI to a terminal device, where each of the plurality of pieces of DCI is used to trigger reporting of one piece of UCI and indicate a PUCCH resource carrying the UCI, the UCI includes at least one piece of CSI and response information, and PUCCH resources indicated by the plurality of pieces of downlink DCI occupy at least one same orthogonal frequency division multiplexing OFDM symbol.

In one embodiment, the plurality of pieces of DCI are sent by the network device to the terminal device at a plurality of different moments. For example, there are two pieces of DCI. The network device sends DCI0 at a moment n. DCI0 is used to trigger reporting of UCI0. UCI0 includes CSI and response information (A/N), and indicates that a PUCCH resource carrying UCI0 is a first PUCCH resource. The network device sends DCI1 to the terminal device at a moment n+1. DCI1 is used to trigger reporting of UCI1. UCI1 includes an A/N, and indicates that a PUCCH resource carrying UCI1 is a second PUCCH resource. The first PUCCH resource and the second PUCCH resource occupy at least one same OFDM symbol. To be specific, DCI0 and DCI1 indicate that UCI0 and UCI1 are reported at a same moment.

In one embodiment, at least two of the plurality of pieces of DCI are sent by the network device at a same moment. The at least two pieces of DCI are sent by the network device on a same component carrier, or the at least two pieces of DCI are sent by the network device on different component carriers.

In one embodiment, the CSI is aperiodic CSI or semi-persistent CSI. The aperiodic CSI is of a CSI type that is triggered once by the network device by using control signaling, and then reported by the terminal device once. The control signaling takes effect only once. Optionally, the control signaling is DCI. The aperiodic CSI is suitable for unstable downlink data packet scheduling, and is triggered and reported only when necessary, so that time frequency resource overheads occupied by CSI reporting can be reduced. The semi-persistent (semi-persistent) CSI is of a CSI type that is triggered once by the network device by using control signaling, and then reported by the terminal device repeatedly based on a predefined period, and the terminal device stops reporting the CSI until the network device sends control signaling again to release the reporting of the CSI. The semi-persistent CSI is suitable for relatively stable downlink data packet scheduling in a period of time. Because the base station is required to send, only once, the control signaling that triggers the CSI and send, only once, the control signaling that releases the CSI, the semi-persistent CSI can avoid a problem of excessive control signaling overheads because control signaling needs to be sent to trigger the CSI each time.

Operation S102: The terminal device sends target UCI on a target PUCCH resource, where the target UCI includes UCI triggered by the plurality of pieces of DCI, and the target PUCCH resource is one of the PUCCH resources indicated by the plurality of pieces of DCI.

Operation S103: The network device receives the target UCI on the target PUCCH resource, where the target UCI includes UCI triggered by all or some of the plurality of pieces of DCI.

It should be noted that in this solution of the present invention, the target UCI is content on which channel coding needs to be performed and that is finally carried in the target PUCCH resource. If one piece of the UCI triggered by the plurality of pieces of DCI is used to select a PUCCH resource from the PUCCH resources indicated by the plurality of pieces of DCI, or is carried in the target PUCCH resource in another manner, the UCI is not included in the target UCI.

Because the terminal device may miss some of the plurality of pieces of DCI, the target UCI received by the network device is UCI triggered by all or some of the plurality of pieces of DCI. The terminal device reports UCI triggered by all DCI detected by the terminal device, to form the target UCI sent by the terminal device. Therefore, the target UCI received by the network device may be the same as or different from the target UCI sent by the terminal device.

In this embodiment, after receiving the plurality of pieces of DCI sent by the network device, the terminal device determines the target PUCCH resource from the PUCCH resources indicated by the plurality of pieces of DCI, and then sends the target UCI to the network device on the target PUCCH resource. The target UCI includes the UCI triggered by the plurality of pieces of DCI. The UCI triggered by each piece of DCI includes at least one piece of the CSI and the response information. The CSI may be the aperiodic CSI or the semi-persistent CSI. The network device receives the target UCI on the target PUCCH resource, so that the UCI triggered by the plurality of pieces of DCI can be transmitted on the PUCCH resource. Therefore, when some of the plurality of pieces of UCI are the aperiodic CSI and some of the plurality of pieces of UCI are the response information, the terminal device can implement reporting of all the UCI without discarding the aperiodic CSI.

Further, when the aperiodic CSI triggered by the DCI can be transmitted on the PUCCH resource, because the network device and the terminal device do not reach a consensus about whether the UCI includes the CSI, an error in interpreting information by the network device occurs because the DCI is missed. To resolve this problem, there are two feasible implementations in this application.

In one embodiment, the PUCCH resources indicated by the plurality of pieces of DCI in operation S101 are a same PUCCH resource, and operation S102 may be: The terminal device sends the target UCI and indication information on the target PUCCH resource, where the indication information is used to indicate a type of the target UCI, the type of the target UCI includes a first type and a second type, UCI of the first type includes CSI, and UCI of the second type does not include CSI, or, a quantity of bits of UCI of the first type is within a first preset range, and a quantity of bits of UCI of the second type is within a second preset range.

In one embodiment, before the terminal device sends the target UCI and the indication information in operation S102, the method may further include:

determining, by the terminal device, the type of the target UCI based on the plurality of pieces of DCI; and determining the type of the target UCI as the first type if one of the plurality of pieces of DCI triggers CSI reporting, and/or determining the type of the target UCI as the second type if none of the plurality of pieces of DCI triggers CSI reporting.

Correspondingly, operation S103 may be: The network device receives the target UCI and the indication information on the target PUCCH resource, where the indication information is used to indicate the type of the target UCI.

In one embodiment, the indication information has two carrying manners, namely, an explicit carrying manner and an implicit carrying manner. In the case of the explicit carrying manner, that the terminal device sends the target UCI and indication information on the target PUCCH resource may be specifically:

The terminal device sends a first information bit sequence on the target PUCCH resource, where a bit in at least one preset position in the first information bit sequence is determined based on the indication information, and the first information bit sequence further includes an information bit sequence of the target UCI. The bit in the at least one preset position in the first information bit sequence is, for example, any of a first bit to an $x^{th}$ bit. For example, one bit (0 or 1) is added in front of an information bit sequence of the UCI to indicate a type of the UCI. The first information bit sequence is $i_0, a_0, \ldots, a_{A-1}$, where $i_0$ is the indication information. The network device interprets $i_0$ to determine whether a subsequent UCI sequence includes the CSI, thereby correctly interpreting the UCI.

In one embodiment, the network device may indicate, through signaling configuration, whether the terminal device sends the indication information when the terminal device sends the UCI. For example, the network device indicates, through signaling configuration, whether indication information of one bit always needs to be added in front of the bit sequence of the UCI. When the network device does not need to trigger, by using the DCI, the aperiodic CSI reported on the PUCCH resource, indication information does not need to be added in front of the bit sequence of the UCI. In this way, bit overheads of the UCI can be reduced. In one embodiment, the signaling may be higher layer signaling, or a multi-access control element (MAC CE). The higher layer signaling is signaling different from a physical layer signaling, and may be one or more of the following messages: a master information block (MIB) message, system information, and a radio resource control (RRC) message. Further, the system information may be a system information block (SIB) message, or a system information block message for configuring a random access channel (RACH) resource. The RRC message may be a common RRC message, that is, an RRC message sent to terminal devices in one cell, or a terminal device-specific RRC message, that is, an RRC message sent to a specific terminal device.

Correspondingly, that the network device receives the target UCI on the target PUCCH resource in operation S103 may be specifically:

The network device receives a first information bit sequence on the target PUCCH resource, where the indication information is determined based on a bit in at least one preset position in the first information bit sequence, and the first information bit sequence further includes an information bit sequence of the target UCI.

In the case of the explicit carrying manner, that the terminal device sends the target UCI and indication information on the target PUCCH resource may be specifically:

The terminal device determines a sequence of a demodulation reference signal (DMRS) of the target PUCCH resource, where the sequence of the DMRS is determined based on the indication information; or, the terminal device determines a sequence of a DMRS of the target PUCCH resource, where the sequence of the DMRS is determined based on a first sequence and a second sequence, the first sequence is determined based on the indication information, and the second sequence is determined based on configuration information received by the terminal device; or the terminal device determines a sequence of a DMRS of the target PUCCH resource, where the sequence of the DMRS is determined based on a dot product result of a first sequence and a second sequence, the first sequence is determined based on the indication information, and the second sequence is determined based on configuration information received by the terminal device; or the terminal device determines a sequence of a DMRS of the target PUCCH resource, where a cyclic shift value or a sequence initialization value of the sequence of the DMRS is determined based on the indication information.

The sequence of the DMRS is determined based on the indication information in a plurality of manners. In one embodiment, the sequence of the DMRS is determined based on the dot product result of the first sequence and the second sequence. For example, the sequence of the DMRS is a complex number sequence with a length of N: $c_0, c_1, \ldots, c_{N-1}$, where $c_k = w_k \cdot y_k (k=0, \ldots, N-1)$. $w_0, \ldots, w_{N-1}$ is a first sequence, and is determined by the terminal device in a plurality of sequences based on the indication information. $y_0, \ldots, y_{N-1}$ is a second sequence, and a specific value may be determined according to a predefined rule.

In one embodiment, the first sequence is selected by the terminal device from I sequences based on the indication information. The I sequences are predefined, or configured by using sequence configuration information received by the terminal device.

In one embodiment, the sequence configuration information is carried by RRC signaling, or is carried by MAC CE signaling.

In one embodiment, in the I sequences, there are two different sequences that satisfy orthogonality. Optionally, that two sequences satisfy orthogonality means that an inner product of the two sequences is 0. If two sequences $u_0, \ldots, u_{m-1}$ and $v_0, \ldots, v_{m-1}$ satisfy $\Sigma_{i=1}^{m} u_{i-1} v^*_{i-1} = 0$ the two sequences satisfy orthogonality.

In one embodiment, a first sequence with a length of N is determined by using a target subsequence with a length of m in a manner of duplication and extension. The target subsequence is determined by the terminal device in a plurality of subsequences based on the indication information. For example, N=4, m=2, the target subsequence is $x_0, x_1$, and the first sequence is $w_0 = x_0$, $w_1 = x_1$, $w_2 = x_0$, $w_3 = x_1$.

Correspondingly, that the network device receives the target UCI on the target PUCCH resource in S103 may be specifically:

The network device receives a DMRS of the target PUCCH resource, and determines the indication information based on a sequence of the DMRS.

When the target PUCCH resource occupies two orthogonal frequency division multiplexing (Orthogonal Frequency Division Multiplexing, OFDM) symbols in time domain, that the terminal device sends the target UCI and indication information on the target PUCCH resource may be specifically:

The terminal device determines a sequence of a DMRS on each of the two OFDM symbols occupied by the target PUCCH resource, where the sequence of the DMRS on one OFDM symbol is determined based on the indication information; or, the terminal device determines a sequence of a DMRS on each of the two OFDM symbols occupied by the target PUCCH resource, where the sequences of the DMRSs on the two OFDM symbols are both determined based on the indication information.

The network device performs correlation computation on the sequence of the DMRS and the foregoing I sequences separately, to determine a sequence selected by the terminal device. In this way, the indication information is determined, and whether the UCI includes the CSI is further learned of, so that the entire UCI sequence is correctly interpreted.

As compared with the explicit carrying manner, in the foregoing method in which the indication information is implicitly carried, a channel coding gain can be obtained when the UCI does not include the CSI. Specifically, when the UCI does not include the CSI, according to an existing method, a length X1 of a to-be-coded information bit sequence of the UCI can be determined. When the UCI includes the CSI, according to the existing method, a length X2 of the to-be-coded information bit sequence of the UCI can be determined. Optionally, X1<X2. A length K of a bit sequence after coding can be determined after the PUCCH resource is determined. Therefore, when the UCI does not include the CSI, a code rate of the UCI is lower, reliability is higher, and a channel coding gain is higher. As compared with the explicit carrying manner, in the implicit carrying manner, it is not required that the lengths of the to-be-coded bit sequences of the two types of UCI are the same, and flexibility is higher.

That the terminal device sends target UCI on a target PUCCH resource in operation S102 may be performed as follows:

Operation S1021: The terminal device determines the information bit sequence $a_0, \ldots, a_{A-1}$ of the target UCI, where if the target UCI includes CSI and response information, a bit sequence $a_{B_1}, \ldots, a_{B_2}$ in $a_0, \ldots, a_{A-1}$ is an information bit sequence of the CSI, $a_{C_1}, \ldots, a_{C_2}$ is an information bit sequence of the response information, A is a length of the information bit sequence of the target UCI, A>C2>C1>B2>B1≥0, and A, B1, B2, C1, and C2 are integers.

If the target UCI does not include the CSI and includes only the response information, an existing mapping manner is used for the information bit sequence of the UCI.

Operation S1022: The terminal device sends the information bit sequence of the target UCI on the target PUCCH resource.

Correspondingly, that the network device receives the target UCI on the target PUCCH resource in operation S103 may be performed as follows:

The network device determines the information bit sequence $a_0, \ldots, a_{A-1}$ of the UCI, where if the type of the target UCI is the first type, a bit sequence $a_{B_1}, \ldots, a_{B_2}$ in the information bit sequence $a_0, \ldots, a_{A-1}$ is an information bit sequence of the CSI, $a_{C_1}, \ldots, a_{C_2}$ is an information bit sequence of the response information, A is a length of the information bit sequence of the target UCI, A>C2>C1>B2>B1≥0, and A, B1, B2, C1, and C2 are integers.

In one embodiment, before determining the information bit sequence of the target UCI, a bit sequence mapping manner that CSI is in front of an A/N is used for the terminal device. In this mapping manner, even if the terminal device misses the last DCI sent by the network device before reporting the target UCI, CSI is not misplaced, so that a problem that the network device misinterprets content of the UCI is avoided. For example, the network device sends two pieces of DCI, namely, DCI0 and DCI1, at a moment n and a moment n+1, respectively. The two pieces of DCI both indicate that the UCI is reported at the moment n+2. Then DCI1 is the last DCI sent by the network device before the terminal device reports the target UCI.

In one embodiment, when the terminal device sends the target UCI, the indication information indicates whether the UCI includes the CSI, and when the UCI includes the CSI, an information bit sequence of the UCI is formed in a bit sequence mapping manner that CSI is in front of an A/N. After receiving the UCI and the indication information, the network device may determine the type of the UCI based on the indication information, to correctly interpret the UCI based on the type of the UCI and the corresponding information bit sequence. In this way, a problem that all content is incorrectly interpreted because the terminal device misses the DCI that triggers the aperiodic CSI can be avoided.

In another embodiment, at least two of the PUCCH resources indicated by the plurality of pieces of DCI are different PUCCH resources. Correspondingly, that the terminal device sends target UCI on a target PUCCH resource in S102 may be: The terminal device determines the target PUCCH resource in the at least two different PUCCH resources according to a preset rule, and the terminal device sends the target UCI on the target PUCCH resource.

In one embodiment, the target PUCCH resource is a PUCCH resource that can carry the largest quantity of encoded bits of the at least two different PUCCH resources; or, the target PUCCH resource is a PUCCH resource indicated by the last DCI of the plurality of pieces of DCI received by the terminal device before the terminal device sends the target UCI; or, the target PUCCH resource is one of PUCCH resources for carrying UCI that includes CSI.

If the UCI carried in at least one of the at least two different PUCCH resources includes the CSI, the target PUCCH resource is one of PUCCH resources for carrying UCI that includes the CSI; or, if the UCI carried in at least two of the at least two different PUCCH resources includes the CSI, the target PUCCH resource is a PUCCH resource that can carry the largest quantity of encoded bits of the two PUCCH resources carrying the UCI that includes the CSI; or if the UCI carried in at least two of the at least two different PUCCH resources includes the CSI, the target PUCCH resource is a PUCCH resource indicated by the last DCI of two pieces of DCI that indicate the at least two PUCCH resources before the terminal device sends the target UCI.

In one embodiment, the PUCCH resources indicated by the plurality of pieces of DCI are PUCCH resources in PUCCH resources configured by first configuration information. Further, the PUCCH resources configured by the first configuration information include at least one first PUCCH resource for carrying UCI that includes CSI and at least one second PUCCH resource for carrying UCI that does not include CSI, and the PUCCH resources indicated by the plurality of pieces of DCI include at least one first PUCCH resource and/or at least one second PUCCH resource.

In one embodiment, before the network device receives the target UCI on the target PUCCH resource in operation S103, the method may further include:

determining, by the network device, the target PUCCH resource in the at least two different PUCCH resources, and determining a type of the target UCI based on the target PUCCH resource.

The type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In one embodiment, the determining, by the network device, a type of the target UCI based on the target PUCCH resource may be: The type of the target UCI is the first type if UCI triggered by DCI that indicates the target PUCCH resource includes CSI; and/or the type of the target UCI is the second type if UCI triggered by DCI that indicates the target PUCCH resource does not include CSI.

In one embodiment, that the terminal device sends target UCI on a target PUCCH resource in operation S102 may be performed as follows:

Operation S1021: The terminal device determines the information bit sequence $a_0, \ldots, a_{A-1}$ of the target UCI, where if the target UCI includes CSI and response information, a bit sequence $a_{B_1}, \ldots, a_{B_2}$ in $a_0, \ldots, a_{A-1}$ is an information bit sequence of the CSI, $a_{C_1}, \ldots, a_{C_2}$ is an information bit sequence of the response information, A is a length of the information bit sequence of the target UCI, $A>C2>C1>B2>B1 \geq 0$, and A, B1, B2, C1, and C2 are integers.

If the target UCI does not include the CSI and includes only the response information, an existing mapping manner is used for the information bit sequence of the UCI.

Operation S1022: The terminal device sends the information bit sequence of the target UCI on the target PUCCH resource.

Correspondingly, that the network device receives the target UCI on the target PUCCH resource in operation S103 may be performed as follows:

The network device determines the information bit sequence $a_0, \ldots, a_{A-1}$ of the UCI, where if the type of the target UCI is the first type, a bit sequence $a_{B_1}, \ldots, a_{B_2}$ in the information bit sequence $a_0, \ldots, a_{A-1}$ is an information bit sequence of the CSI, $a_{C_1}, \ldots, a_{C_2}$ is an information bit sequence of the response information, A is a length of the information bit sequence of the target UCI, $A>C2>C1>B2>B1 \geq 0$, and A, B1, B2, C1, and C2 are integers.

In one embodiment, the terminal device determines the target PUCCH resource in the at least two different PUCCH resources according to the preset rule, and sends the target UCI on the target PUCCH resource, where when the UCI includes the CSI, an information bit sequence of the UCI is formed in a bit sequence mapping manner that CSI is in front of an A/N. The network device determines the target PUCCH resource in the at least two different PUCCH resources, and determines the type of the target UCI based on the target PUCCH resource, to correctly interpret the UCI based on the type of the UCI and the corresponding information bit sequence. In this way, a problem that all content is incorrectly interpreted because the terminal device misses the DCI that triggers the aperiodic CSI can be avoided.

The technical solution of the method embodiment shown in FIG. 5 is described in detail below by using two specific embodiments.

Figure 6:
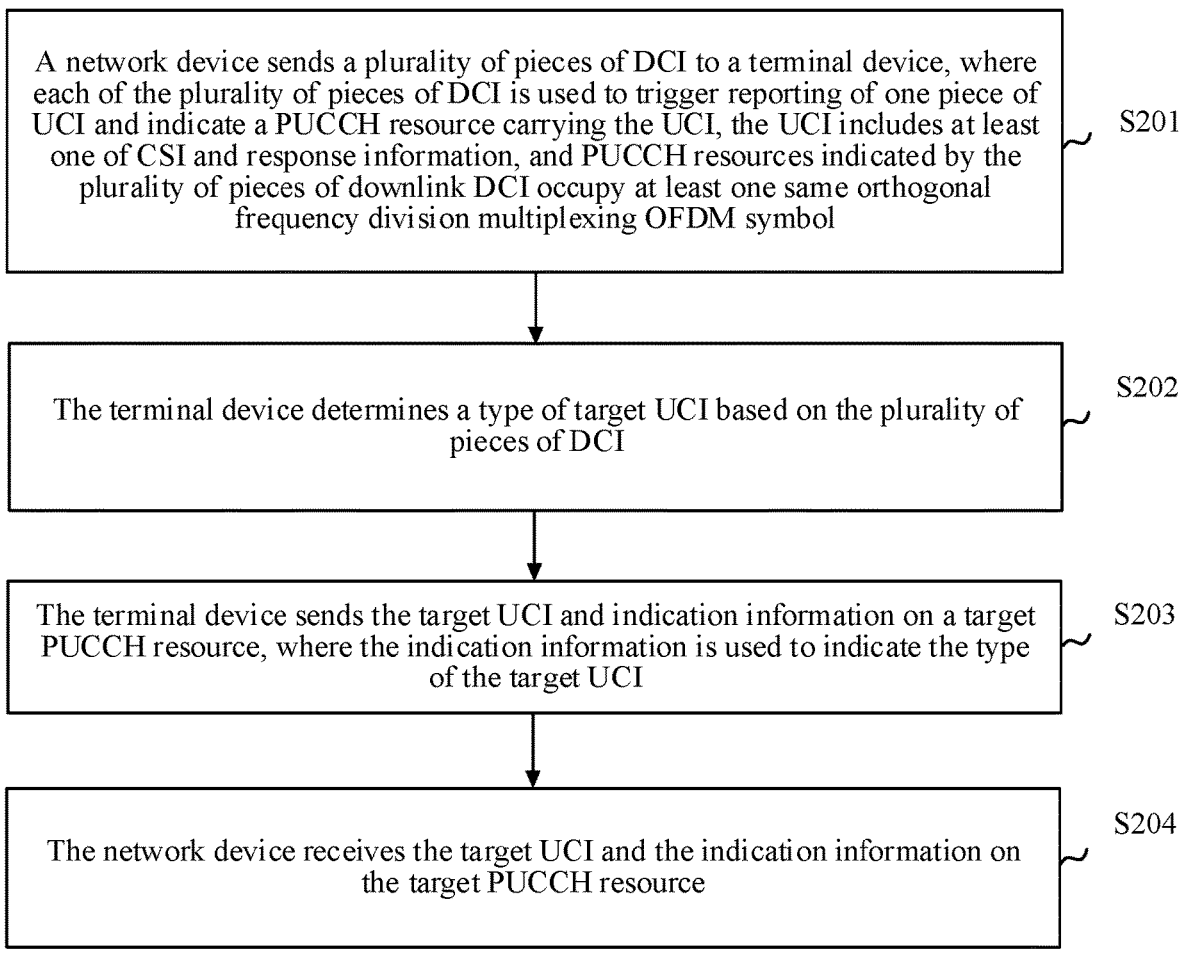
FIG. 6 is a flowchart of an embodiment of an information transmission method according to this application.

FIG. 6 is a flowchart of an embodiment of an information transmission method according to this application. As shown in FIG. 6, in this embodiment, for example, PUCCH resources indicated by a plurality of pieces of DCI are identical PUCCH resource, and a terminal device indicates a type of UCI by using indication information when sending the UCI. The method of this embodiment may include the following operations.

Operation S201: A network device sends a plurality of pieces of DCI to a terminal device, where each of the plurality of pieces of DCI is used to trigger reporting of one piece of UCI and indicate a PUCCH resource carrying the UCI, the UCI includes at least one piece of CSI and response information, and PUCCH resources indicated by the plurality of pieces of downlink DCI occupy at least one identical OFDM symbol.

The CSI is aperiodic CSI or semi-persistent CSI.

Operation S202: The terminal device determines a type of target UCI based on the plurality of pieces of DCI.

The type of the target UCI includes a first type and a second type, UCI of the first type includes CSI, and UCI of the second type does not include CSI, or, a quantity of bits of UCI of the first type is within a first preset range, and a quantity of bits of UCI of the second type is within a second preset range. The type of the target UCI is determined as the first type if one of the plurality of pieces of DCI triggers CSI reporting, and/or the type of the target UCI is determined as the second type if none of the plurality of pieces of DCI triggers CSI reporting.

Operation S203: The terminal device sends the target UCI and indication information on a target PUCCH resource, where the indication information is used to indicate the type of the target UCI.

Operation S204: The network device receives the target UCI and the indication information on the target PUCCH resource.

In one embodiment, the indication information has two carrying manners, namely, an explicit carrying manner and an implicit carrying manner.

When the explicit carrying manner is used, operation S203 may be performed as follows: The terminal device sends a first information bit sequence on the target PUCCH resource, where a bit in at least one preset position in the first information bit sequence is determined based on the indication information, and the first information bit sequence further includes an information bit sequence of the target UCI.

Correspondingly, operation S204 may be performed as follows: The network device receives the first information bit sequence on the target PUCCH resource.

When the implicit carrying manner is used, operation S203 may be performed as follows: The terminal device determines a sequence of a DMRS of the target PUCCH resource, where the sequence of the DMRS is determined based on the indication information; or, the terminal device determines a sequence of a DMRS of the target PUCCH resource, where the sequence of the DMRS is determined based on a first sequence and a second sequence, the first sequence is determined based on the indication information, and the second sequence is determined based on configuration information received by the terminal device; or the terminal device determines a sequence of a DMRS of the target PUCCH resource, where the sequence of the DMRS is determined based on a dot product result of a first sequence and a second sequence, the first sequence is determined based on the indication information, and the second sequence is determined based on configuration information received by the terminal device; or, the terminal device determines a sequence of a DMRS of the target PUCCH resource, where a cyclic shift value or a sequence initialization value of the sequence of the DMRS is determined based on the indication information.

Correspondingly, operation S204 may be performed as follows: The network device receives a DMRS of the target PUCCH resource, and determines the indication information based on a sequence of the DMRS. Refer to related descriptions of the embodiment shown in FIG. 5 for a specific determining manner, and details are not described herein again.

In one embodiment, that the terminal device sends the target UCI on a target PUCCH resource in operation S203 may be performed as follows:

The terminal device determines an information bit sequence $a_0, \ldots, a_{A-1}$ of the target UCI, where if the target UCI includes CSI and response information, a bit sequence $a_{B_1}, \ldots, a_{B_2}$ in $a_0, \ldots, a_{A-1}$ is an information bit sequence of the CSI, $a_{C_1}, \ldots, a_{C_2}$ is an information bit sequence of the response information, A is a length of the information bit sequence of the target UCI, A>C2>C1>B2>B1≥0, and A, B1, B2, C1, and C2 are integers. If the target UCI does not include the CSI and includes only the response information, an existing mapping manner is used for the information bit sequence of the UCI.

The terminal device sends the information bit sequence of the target UCI on the target PUCCH resource.

Correspondingly, that the network device receives the target UCI on the target PUCCH resource in operation S204 may be performed as follows:

The network device determines the information bit sequence $a_0, \ldots, a_{A-1}$ of the UCI, where if the type of the target UCI is the first type, a bit sequence $a_{B_1}, \ldots, a_{B_2}$ in the information bit sequence $a_0, \ldots, a_{A-1}$ is an information bit sequence of the CSI, $a_{C_1}, \ldots, a_{C_2}$ is an information bit sequence of the response information, A is a length of the information bit sequence of the target UCI, A>C2>C1>B2>B1≥0, and A, B1, B2, C1, and C2 are integers.

In the information transmission method provided in this embodiment, when the terminal device sends the UCI, the indication information indicates whether the UCI includes the CSI, and when the UCI includes the CSI, an information bit sequence of the UCI is formed in a bit sequence mapping manner that CSI is in front of an A/N. After receiving the UCI and the indication information, the network device may determine the type of the UCI based on the indication information, to correctly interpret the UCI based on the type of the UCI and the corresponding information bit sequence. In this way, a problem that all content is incorrectly interpreted because the terminal device misses the DCI that triggers the aperiodic CSI can be avoided.

The technical solution of the method embodiment shown in FIG. 6 is described in detail below by using an example in which there are two pieces of DCI.

Figure 7:
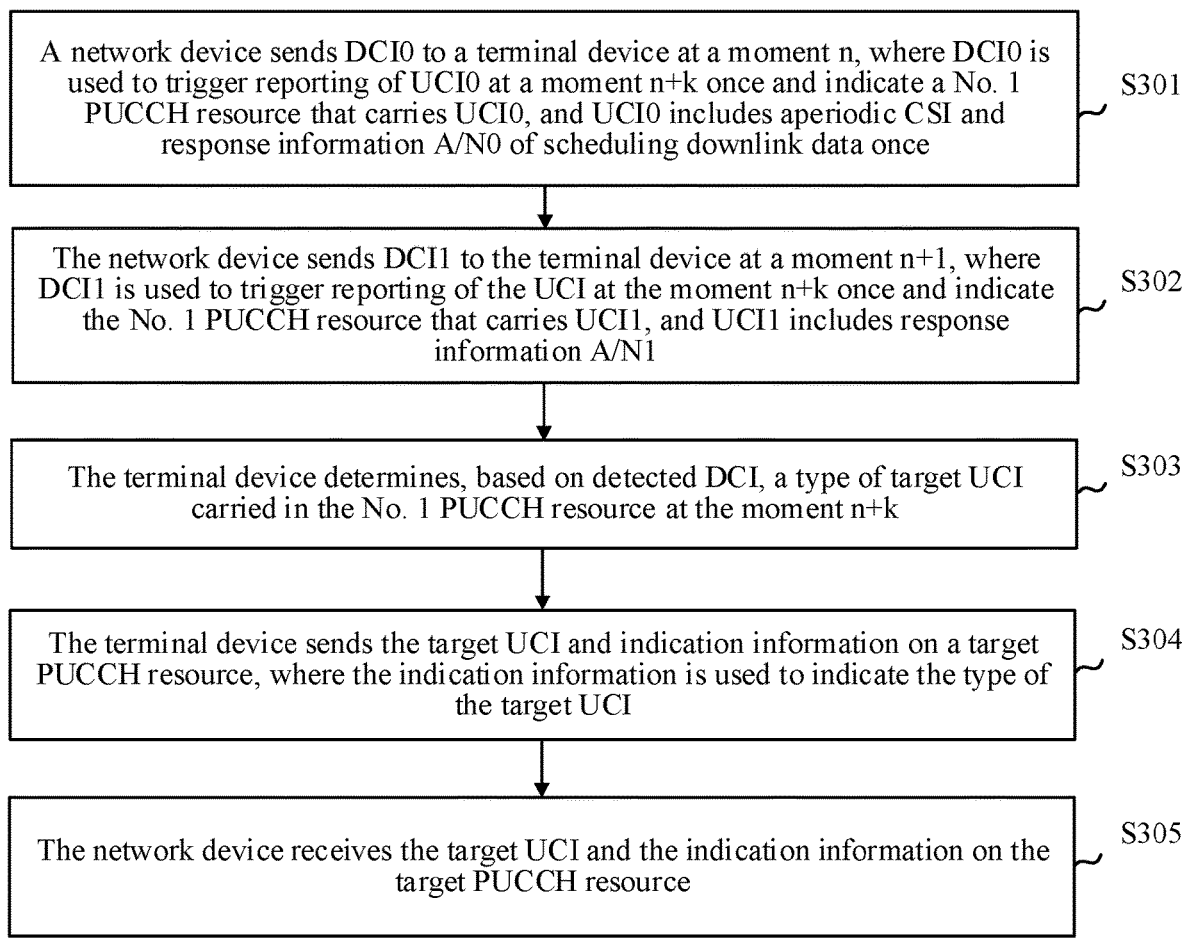
FIG. 7 is a flowchart of an embodiment of an information transmission method according to this application.

FIG. 7 is a flowchart of an embodiment of an information transmission method according to this application. As shown in FIG. 7, the method of this embodiment may include the following operations.

Operation S301: A network device sends DCI0 to a terminal device at a moment n, where DCI0 is used to trigger reporting of UCI0 at a moment n+k once and indicate a No. 1 PUCCH resource that carries UCI0, and UCI0 includes aperiodic CSI and response information A/N0 of scheduling downlink data once. k is an integer greater than or equal to 2.

Operation S302: The network device sends DCI1 to the terminal device at a moment n+1, where DCI1 is used to trigger reporting of the UCI at the moment n+k once and indicate the No. 1 PUCCH resource that carries UCI1, and UCI1 includes response information A/N1.

Operation S303: The terminal device determines, based on detected DCI, a type of target UCI carried in the No. 1 PUCCH resource at the moment n+k.

Although the network device sends DCI0 and DCI1, the terminal device may miss DCI. Therefore, there are three following cases:

(1) If the terminal device correctly detects DCI0 and DCI1, to be specific, one of two pieces of DCI triggers CSI reporting, the type of the target UCI is a first type, and the target UCI includes the CSI, A/N0, and A/N1.

(2) If the terminal device correctly detects DCI1 and misses DCI0, one piece of DCI received by the terminal device does not trigger CSI reporting, the type of the target UCI is a second type, the target UCI includes A/N1, and may also include a 0 bit padded for A/N0. Refer to the foregoing descriptions for a specific padding manner, and details are not described herein again.

(3) If the terminal device correctly detects DCI0 and misses DCI1, one piece of DCI received by the terminal device triggers CSI reporting, the type of the target UCI is a first type, and the target UCI includes A/N0 and the CSI.

The UCI of the first type includes the CSI, and the UCI of the second type does not include the CSI.

Operation S304: The terminal device sends the target UCI and indication information on a target PUCCH resource, where the indication information is used to indicate the type of the target UCI.

Operation S305: The network device receives the target UCI and the indication information on the target PUCCH resource.

In one embodiment, the indication information has two carrying manners, namely, an explicit carrying manner and an implicit carrying manner.

When the explicit carrying manner is used, operation S304 is: the terminal device sends a first information bit sequence $i_0, a_0, \ldots, a_{A-1}$ on a target PUCCH resource, where $i_0$ is indication information. For example, when $i_0$ is 1, $i_0$ indicates that the target UCI is of the first type, and when $i_0$ is 0, $i_0$ indicates that the target UCI is of the second type. The indication information may be alternatively indicated by two or more bits. An information bit sequence of the target UCI is $a_0, \ldots, a_{A-1}$. Correspondingly, S305 is: The network device receives the first information bit sequence $i_0, a_0, \ldots, a_{A-1}$ on the target PUCCH resource, and can determine the type of the target UCI based on $i_0$.

When the implicit carrying manner is used, the sequence of the DMRS is determined based on a dot product result of a first sequence and a second sequence. For example, the sequence of the DMRS is a complex number sequence with a length of N: $c_0, C_1, \ldots, c_{N-1}$, where $c_k = w_k \cdot y_k$ (k=0, ..., N-1). $w_0, \ldots, w_{N-1}$ is a first sequence, and is determined by the terminal device in a plurality of sequences based on the indication information. $y_0, \ldots, y_{N-1}$ is a second sequence, and a specific value may be determined according to a predefined rule. The first sequence is selected by the terminal device from I sequences based on the indication information. The I sequences are predefined, or configured by using sequence configuration information received by the terminal device. The sequence configuration information is carried by RRC signaling, or is carried by MAC CE signaling. In the I sequences, there are two different sequences that satisfy orthogonality.

In one embodiment, a first sequence with a length of N is determined by using a target subsequence with a length of m in a manner of duplication and extension. The target subsequence is determined by the terminal device in a plurality of subsequences based on the indication information. For example, N=4, m=2, the target subsequence is $x_0, x_1$, and the first sequence is $w_0 = x_0$, $w_1 = x_1$, $w_2 = x_0$, $w_3 = x_1$. In a manner of implicitly carrying the indication information, a channel coding gain can be obtained when the target UCI does not include the CSI.

In one embodiment, the terminal device sends the target UCI on the target PUCCH resource. If the target UCI includes CSI and response information, the terminal device determines that a bit sequence $a_{B_1}, \ldots, a_{B_2}$ in the information bit sequence $a_0, \ldots, a_{A-1}$ of the target UCI is an information bit sequence of the CSI, $a_{C_1}, \ldots, a_{C_2}$ is an information bit sequence of the response information, A is a length of the information bit sequence of the target UCI, $A > C2 > C1 > B2 > B1 \geq 0$, and A, B1, B2, C1, and C2 are integers. If the target UCI does not include the CSI and includes only the response information, an existing mapping manner is used for the information bit sequence of the UCI. After receiving the target UCI and the indication information, the network device determines the type of the target UCI based on the indication information. If the type of the target UCI is the first type, the network device determines that the bit sequence $a_{B_1}, \ldots, a_{B_2}$ in the information bit sequence $a_0, \ldots, a_{A-1}$ of the target UCI is the information bit sequence of the CSI, and $a_{C_1}, \ldots, a_{C_2}$ is the information bit sequence of the response information.

Figure 8:
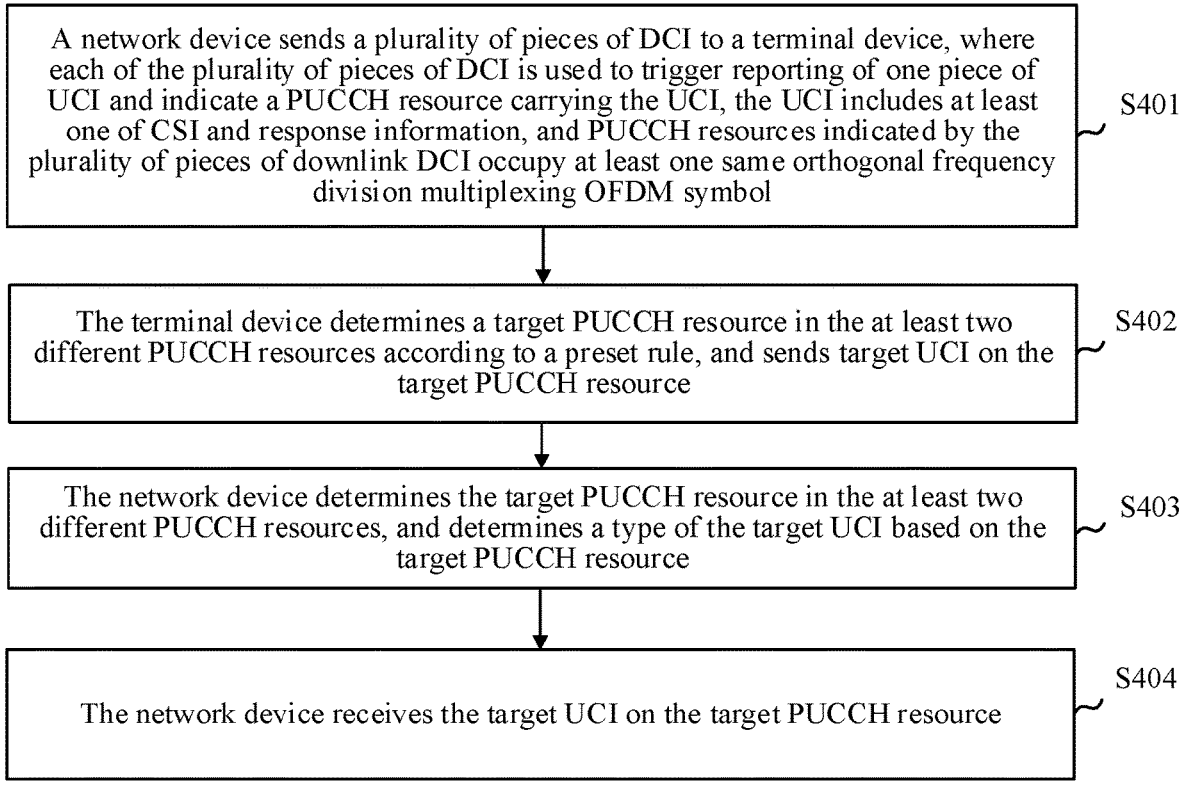
FIG. 8 is a flowchart of an embodiment of an information transmission method according to this application.

FIG. 8 is a flowchart of an embodiment of an information transmission method according to this application. As shown in FIG. 8, in this embodiment, for example, at least two of PUCCH resources indicated by a plurality of pieces of DCI are different PUCCH resources, and a terminal device determines a target PUCCH resource in the at least two different PUCCH resources according to a preset rule. The method of this embodiment may include the following operations.

Operation S401: The network device sends a plurality of pieces of DCI to a terminal device, where each of the plurality of pieces of DCI is used to trigger reporting of one piece of UCI and indicate a PUCCH resource carrying the UCI, the UCI includes at least one piece of CSI and response information, and PUCCH resources indicated by the plurality of pieces of downlink DCI occupy at least one same orthogonal frequency division multiplexing OFDM symbol.

The CSI is aperiodic CSI or semi-persistent CSI, and at least two of the PUCCH resources indicated by the plurality of pieces of DCI are different PUCCH resources.

Operation S402: The terminal device determines the target PUCCH resource in the at least two different PUCCH resources according to the preset rule, and sends the target UCI on the target PUCCH resource.

In one embodiment, the target PUCCH resource is a PUCCH resource that can carry the largest quantity of encoded bits of the at least two different PUCCH resources; or, the target PUCCH resource is a PUCCH resource indicated by the last DCI of the plurality of pieces of DCI received by the terminal device before the terminal device sends the target UCI; or, the target PUCCH resource is one of PUCCH resources for carrying UCI that includes CSI.

In one embodiment, that the terminal device sends the target UCI on the target PUCCH resource may be performed as follows:

The terminal device determines an information bit sequence $a_0, \ldots, a_{A-1}$ of the target UCI, where if the target UCI includes CSI and response information, a bit sequence $a_{B_1}, \ldots, a_{B_2}$ in $a_0, \ldots, a_{A-1}$ is an information bit sequence of the CSI, $a_{C_1}, \ldots, a_{C_2}$ is an information bit sequence of the response information, A is a length of the information bit sequence of the target UCI, $A > C2 > C1 > B2 > B1 \geq 0$, and A, B1, B2, C1, and C2 are integers. If the target UCI does not include the CSI and includes only the response information, an existing mapping manner is used for the information bit sequence of the UCI. The terminal device sends the information bit sequence of the target UCI on the target PUCCH resource.

Operation S403: The network device determines the target PUCCH resource in the at least two different PUCCH resources, and determines a type of the target UCI based on the target PUCCH resource.

The type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In one embodiment, that the network device determines a type of the target UCI based on the target PUCCH resource may be: The type of the target UCI is the first type if UCI triggered by DCI that indicates the target PUCCH resource includes CSI; and/or the type of the target UCI is the second type if UCI triggered by DCI that indicates the target PUCCH resource does not include CSI.

Operation S404: The network device receives the target UCI on the target PUCCH resource.

In one embodiment, the network device determines the information bit sequence $a_0, \ldots, a_{A-1}$ of the UCI, where if the type of the target UCI is the first type, a bit sequence $a_{B_1}, \ldots, a_{B_2}$ in the information bit sequence $a_0, \ldots, a_{A-1}$ is an information bit sequence of the CSI, $a_{C_1}, \ldots, a_{C_2}$ is an information bit sequence of the response information, A is a length of the information bit sequence of the target UCI, $A > C2 > C1 > B2 > B1 \geq 0$, and A, B1, B2, C1, and C2 are integers.

In the information transmission method provided in this embodiment, the terminal device determines the target PUCCH resource in the at least two different PUCCH resources according to the preset rule, and sends the target UCI on the target PUCCH resource, where when the UCI includes the CSI, an information bit sequence of the UCI is formed in a bit sequence mapping manner that CSI is in front of an A/N. The network device determines the target PUCCH resource in the at least two different PUCCH resources, and determines the type of the target UCI based on the target PUCCH resource, to correctly interpret the UCI based on the type of the UCI and the corresponding information bit sequence. In this way, a problem that all content is incorrectly interpreted because the terminal device misses the DCI that triggers the aperiodic CSI can be avoided.

The technical solution of the method embodiment shown in FIG. 7 is described in detail below by using an example in which there are two pieces of DCI.

Figure 9:
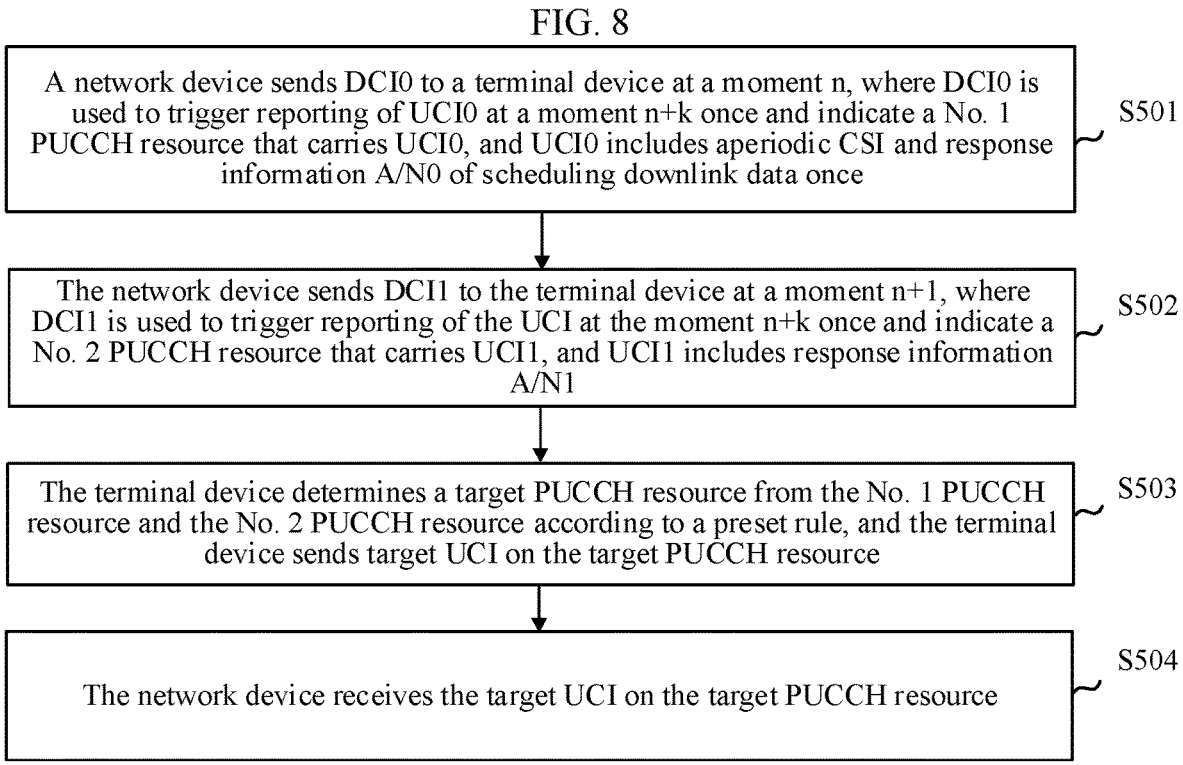
FIG. 9 is a flowchart of an embodiment of an information transmission method according to this application.

FIG. 9 is a flowchart of an embodiment of an information transmission method according to this application. As shown in FIG. 9, the method of this embodiment may include:

Operation S501: A network device sends DCI0 to a terminal device at a moment n, where DCI0 is used to trigger reporting of UCI0 at a moment n+k once and indicate a No. 1 PUCCH resource that carries UCI0, and UCI0 includes aperiodic CSI and response information A/N0 of scheduling downlink data once. k is an integer greater than or equal to 2.

Operation S502: The network device sends DCI1 to the terminal device at a moment n+1, where DCI1 is used to trigger reporting of the UCI at the moment n+k once and indicate a No. 2 PUCCH resource that carries UCI1, and UCI1 includes response information A/N1.

Figure 10:
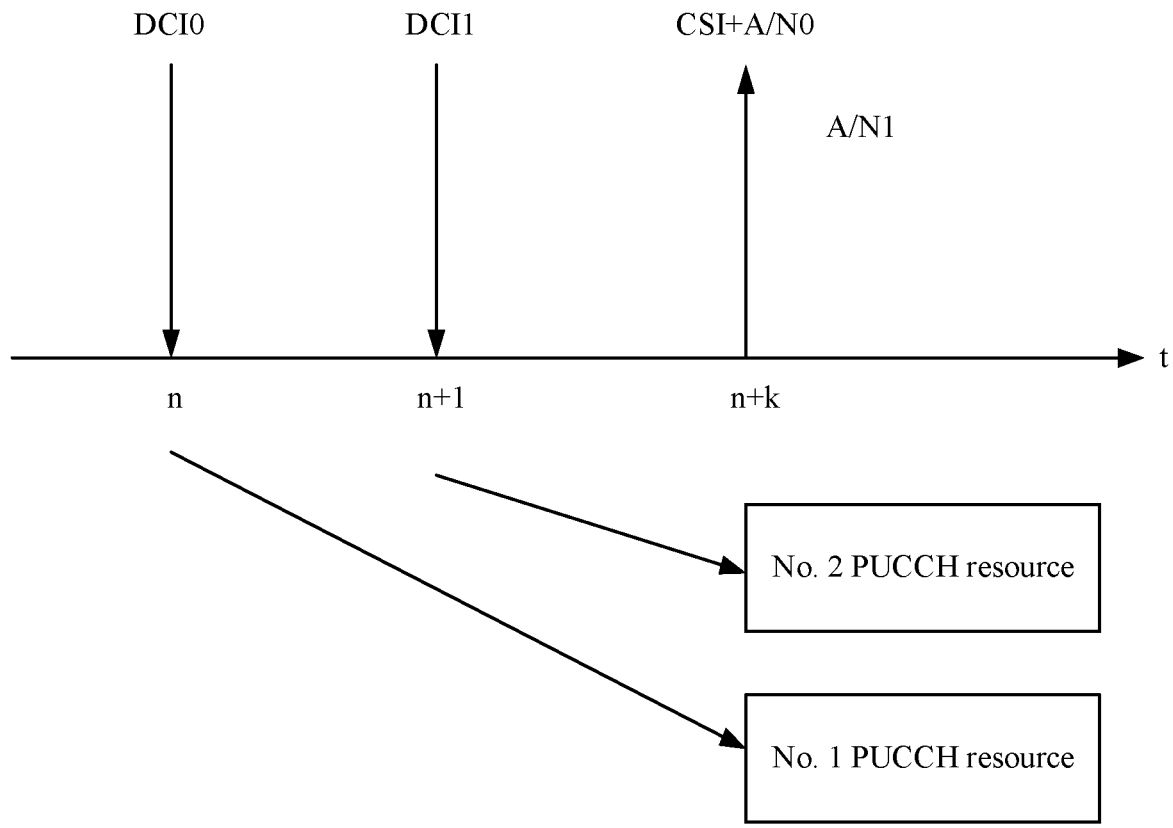
FIG. 10 is a schematic diagram of PUCCH resources respectively indicated by DCI0 and DCI1.

FIG. 10 a schematic diagram of the PUCCH resources respectively indicated by DCI0 and DCI1. As shown in FIG. 10, the No. 1 PUCCH resource and the No. 2 PUCCH resource are different PUCCH resources. A quantity of encoded bits that the No. 1 PUCCH resource can carry is greater than that the No. 2 PUCCH resource can. Specifically, because a quantity of bits of UCI required to report only A/N1 may be greatly different from a quantity of bits of UCI required to report both A/N1 and the CSI, DCI1 allocates another PUCCH resource, namely, the No. 2 PUCCH resource. However, the No. 2 resource and the No. 1 resource occupy a same OFDM symbol. To be specific, the CSI, A/N0, and A/N1 that correspond to DCI0 and DCI1 are reported at a same moment but by using different PUCCH resources.

In this embodiment, the No. 1 PUCCH resource indicated by DCI0 that triggers the CSI is different from the No. 2 PUCCH resource indicated by subsequent DCI1 that schedules only data. The No. 1 PUCCH resource and the No. 2 PUCCH resource occupy at least one same OFDM symbol, but only one PUCCH resource can be used to carry the CSI. A time-frequency code resource occupied by each PUCCH is preconfigured by the network device.

Operation S503: The terminal device determines a target PUCCH resource from the No. 1 PUCCH resource and the No. 2 PUCCH resource according to a preset rule, and the terminal device sends the target UCI on the target PUCCH resource.

Operation S504: The network device receives the target UCI on the target PUCCH resource.

In one embodiment, the target PUCCH resource is a PUCCH resource that can carry the largest quantity of encoded bits of the No. 1 PUCCH resource and the No. 2 PUCCH resource, that is, the No. 1 PUCCH resource; or, the target PUCCH resource is a PUCCH resource indicated by the last DCI of the plurality of pieces of DCI received by the terminal device before the terminal device sends the target UCI, that is, the No. 2 PUCCH resource; or, the target PUCCH resource is one of PUCCH resources for carrying UCI that includes CSI, that is, the No. 1 PUCCH resource.

When receiving DCI0 and DCI1, the terminal device can determine that the No. 1 resource and the No. 2 resource that are selected by two pieces of DCI occupy a same OFDM symbol, and learn of that the No. 1 resource may carry the CSI, and the No. 2 resource does not carry the CSI. There are the following three cases:

1) When the terminal device simultaneously detects DCI0 and DCI1, the terminal device selects the No. 1 resource to carry the CSI, A/N0, and A/N1, and forms information bit sequences of the CSI and the A/N into the information bit sequence of the UCI in a mapping manner that CSI is in front of an A/N in the foregoing embodiment.

2) When the terminal device detects DCI0 but misses DCI1, the terminal device does not know that downlink data is scheduled for the second time, and does not know that the No. 2 resource is allocated. Therefore, the terminal device selects the No. 1 resource to carry the CSI and A/N0, and forms information bit sequences of the CSI and A/N0 into the information bit sequence of the UCI in a mapping manner that CSI is in front of an A/N in the foregoing embodiment.

3) When the terminal device detects DCI1 and misses DCI0, the terminal device does not know that reporting of aperiodic CSI is scheduled, and does not know that the No. 1 resource is allocated. However, the terminal device determines, based on indication information in DCI1, that two pieces of A/N information need to be fed back a current time. Therefore, the terminal device selects the No. 2 resource to carry the A/N, may further carry a 0 bit padded for A/N0, and forms the information bit sequence of the A/N into the information bit sequence of the UCI in the existing mapping manner.

Therefore, all UCI information that needs to be fed back in reporting of the UCI is carried in the PUCCH resource indicated by the DCI that triggers the CSI, provided that the terminal device detects the DCI that triggers the CSI. If the terminal device misses the DCI that triggers the CSI, all UCI information that needs to be fed back in reporting of the UCI is carried in the PUCCH resource indicated by other DCI.

The network device allocates the No. 1 PUCCH resource and the No. 2 PUCCH resource by using DCI0 and DCI1, but the network device does not know whether the terminal device detects both pieces of DCI. Therefore, the network device performs blind detection on the two PUCCH resources. A method for blind detection may be energy detection, signal-to-noise ratio detection, or another detection manner. Using energy detection as an example, when the network device detects energy that exceeds a threshold on the No. 1 PUCCH resource, the network device may determine that the terminal device has definitely detected DCI0, and therefore the CSI definitely exists in current reporting, so that the information bit sequence of the UCI can be correctly interpreted. When the network device detects energy that exceeds a threshold on the No. 2 PUCCH resource, the network device may determine that the terminal device has definitely missed DCI0, and there is definitely no CSI in current reporting, so that the information bit sequence of the UCI can be correctly interpreted. A manner of signal-to-noise ratio detection is similar, and details are not described herein.

Further, the No. 1 PUCCH resource and the No. 2 PUCCH resource are PUCCH resources of PUCCH resources configured by first configuration information. The PUCCH resources configured by the first configuration information include at least one first PUCCH resource for carrying UCI that includes CSI and at least one second PUCCH resource for carrying UCI that does not include CSI, and the No. 1 PUCCH resource and the No. 2 PUCCH resource include at least one first PUCCH resource and/or at least one second PUCCH resource.

In one embodiment, the No. 1 resource and the No. 2 resource are selected from a same plurality of PUCCH resources. The plurality of PUCCH resources are configured by the network device by using signaling, for example, RRC signaling. The DCI indicates, by using a bit field, a PUCCH resource to be selected from the plurality of PUCCH resources a current time.

In one embodiment, the No. 1 resource and the No. 2 resource are selected from different pluralities of PUCCH resources. For example, a base station configures a first plurality of PUCCH resources and a second plurality of PUCCH resources by using signaling (for example, RRC signaling, MAC CE signaling, or DCI signaling). When the DCI triggers reporting of the aperiodic CSI, the DCI indicates, by using a bit field, a PUCCH resource to be selected from the first plurality of PUCCH resources a current time. When the DCI does not trigger reporting of the aperiodic CSI, the DCI indicates, by using a bit field, a PUCCH resource to be selected from the second plurality of PUCCH resources a current time. In addition, the PUCCH resources indicated twice are different.

Figure 11:
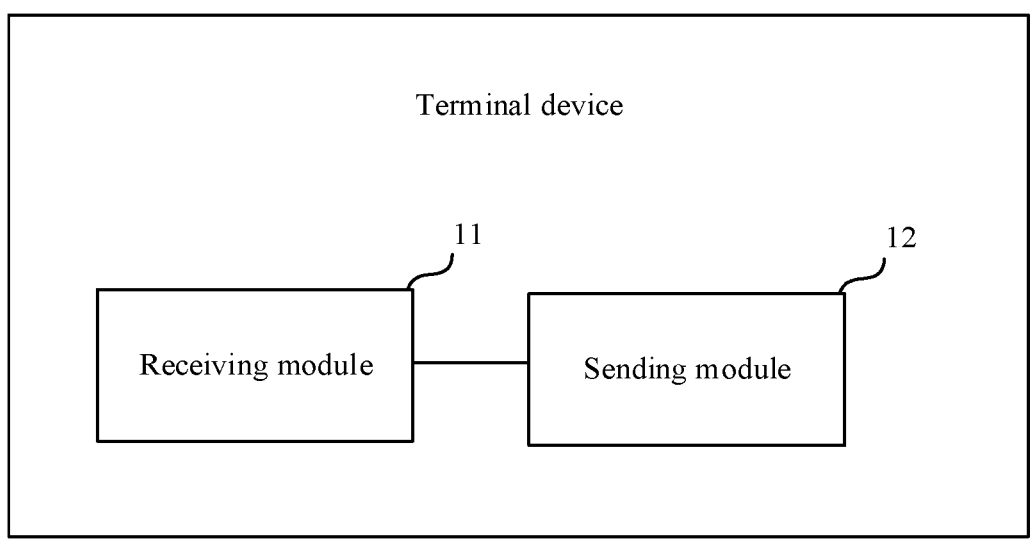
FIG. 11 is a schematic structural diagram of an embodiment of a terminal device according to this application.

FIG. 11 is a schematic structural diagram of an embodiment of a terminal device according to this application. As shown in FIG. 11, the terminal device of this embodiment may include a receiving module 11 and a sending module 12. The receiving module 11 is configured to receive a plurality of pieces of downlink control information DCI, where each of the plurality of pieces of DCI is used to trigger reporting of one piece of UCI and indicate a physical uplink control channel PUCCH resource carrying the UCI, the UCI includes at least one piece of channel state information CSI and response information, and PUCCH resources indicated by the plurality of pieces of downlink DCI occupy at least one same orthogonal frequency division multiplexing OFDM symbol. The sending module 12 is configured to send target UCI on a target PUCCH resource, where the target UCI includes UCI triggered by the plurality of pieces of DCI, and the target PUCCH resource is one of the PUCCH resources indicated by the plurality of pieces of DCI.

In one embodiment, the PUCCH resources indicated by the plurality of pieces of DCI are a same PUCCH resource, and the sending module 12 is configured to send the target UCI and indication information on the target PUCCH resource, where the indication information is used to indicate a type of the target UCI, the type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

The apparatus in this embodiment may be configured to execute the technical solutions of the method embodiment shown from FIG. 5 to FIG. 9. The implementation principles and technical effects are similar, and are not further described herein.

Figure 12:
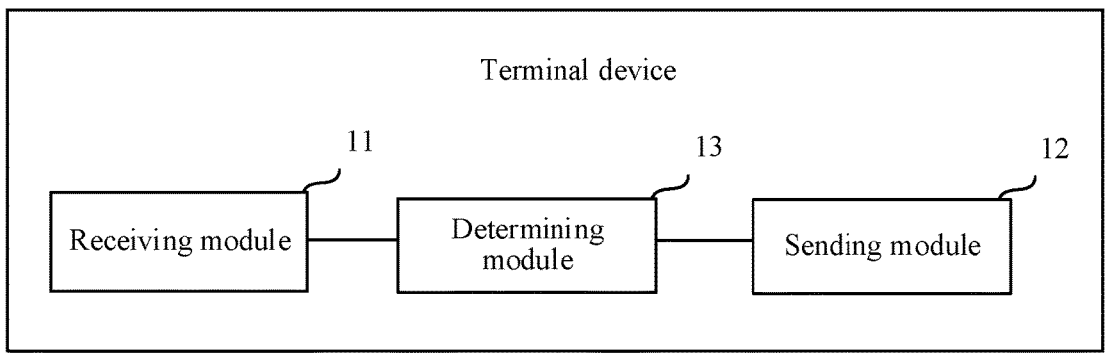
FIG. 12 is a schematic structural diagram of an embodiment of a terminal device according to this application.

FIG. 12 is schematic structural diagram of an embodiment of a terminal device according to this application. As shown in FIG. 12, based on the apparatus structure shown in FIG. 12, the apparatus of this embodiment may further include a determining module 13. The determining module 13 is configured to: determine the type of the target UCI based on the plurality of pieces of DCI; and determine the type of the target UCI as the first type if one of the plurality of pieces of DCI triggers CSI reporting, and/or determine the type of the target UCI as the second type if none of the plurality of pieces of DCI triggers CSI reporting.

In one embodiment, the sending module 12 is configured to send a first information bit sequence on the target PUCCH resource, where a bit in at least one preset position in the first information bit sequence is determined based on the indication information, and the first information bit sequence further includes an information bit sequence of the target UCI.

In one embodiment, the sending module 12 is configured to determine a sequence of a demodulation reference signal DMRS of the target PUCCH resource, where the sequence of the DMRS is determined based on a first sequence and a second sequence, the first sequence is determined based on the indication information, and the second sequence is determined based on configuration information received by the terminal device.

In one embodiment, at least two of the PUCCH resources indicated by the plurality of pieces of DCI are different PUCCH resources, and the sending module 12 is configured to: determine the target PUCCH resource in the at least two different PUCCH resources according to a preset rule, and send the target UCI on the target PUCCH resource.

In one embodiment, the target PUCCH resource is a PUCCH resource that can carry the largest quantity of encoded bits of the at least two different PUCCH resources; or, the target PUCCH resource is a PUCCH resource indicated by the last DCI of the plurality of pieces of DCI received by the terminal device before the terminal device sends the target UCI; or, the target PUCCH resource is one of PUCCH resources for carrying UCI that includes CSI.

In one embodiment, the PUCCH resources indicated by the plurality of pieces of DCI are PUCCH resources in PUCCH resources configured by first configuration information.

Further, the PUCCH resources configured by the first configuration information include at least one first PUCCH resource for carrying UCI that includes CSI and at least one second PUCCH resource for carrying UCI that does not include CSI, and the PUCCH resources indicated by the plurality of pieces of DCI include at least one first PUCCH resource and/or at least one second PUCCH resource.

In this embodiment, the CSI is aperiodic CSI or semi-persistent CSI.

In one embodiment, the sending module 12 is configured to: determine the information bit sequence $a_0, \ldots, a_{A-1}$ of the target UCI, where if the target UCI includes CSI and response information, a bit sequence $a_{B_1}, \ldots, a_{B_2}$ in $a_0, \ldots, a_{A-1}$ is an information bit sequence of the CSI, $a_{C_1}, \ldots, a_{C_2}$ is an information bit sequence of the response information, A is a length of the information bit sequence of the target UCI, $A > C2 > C1 > B2 > B1 \geq 0$, and A, B1, B2, C1, and C2 are integers; and send the information bit sequence on the target PUCCH resource.

The apparatus in this embodiment may be configured to execute the technical solutions of the method embodiment shown from FIG. 5 to FIG. 9. The implementation principles and technical effects are similar, and are not further described herein.

Figure 13:
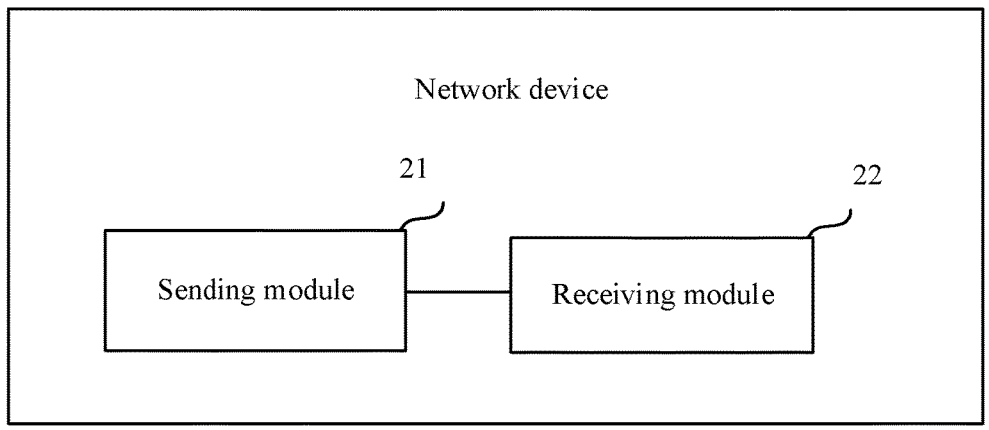
FIG. 13 is a schematic structural diagram of an embodiment of a network device according to this application.

FIG. 13 is a schematic structural diagram of an embodiment of a network device according to this application. As shown in FIG. 13, the network device in this embodiment may include a sending module 21 and a receiving module 22. The sending module 21 is configured to send a plurality of pieces of downlink control information DCI, where each of the plurality of pieces of DCI is used to trigger reporting of one piece of UCI and indicate a physical uplink control channel PUCCH resource carrying the UCI, the UCI includes at least one piece of channel state information CSI and response information, and PUCCH resources indicated by the plurality of pieces of downlink DCI occupy at least one same orthogonal frequency division multiplexing OFDM symbol. The receiving module 22 is configured to receive target UCI on a target PUCCH resource, where the target PUCCH resource is one of the PUCCH resources indicated by the plurality of pieces of DCI, and the target UCI includes UCI triggered by all or some of the plurality of pieces of DCI.

In one embodiment, the PUCCH resources indicated by the plurality of pieces of DCI are a same PUCCH resource, and the receiving module 22 is configured to:

receive the target UCI and indication information on the target PUCCH resource, where the indication information is used to indicate a type of the target UCI, the type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In one embodiment, the receiving module 22 is configured to receive a first information bit sequence on the target PUCCH resource, where the indication information is determined based on a bit in at least one preset position in the first information bit sequence, and the first information bit sequence further includes an information bit sequence of the target UCI.

In one embodiment, the receiving module 22 is configured to: receive a demodulation reference signal DMRS of the target PUCCH resource, and determine the indication information based on a sequence of the DMRS, where the sequence of the DMRS is determined based on a first sequence and a second sequence, the first sequence is determined based on the indication information, and the second sequence is determined based on configuration information sent by the network device.

The apparatus in this embodiment may be configured to execute the technical solutions of the method embodiment shown from FIG. 5 to FIG. 9. The implementation principles and technical effects are similar, and are not further described herein.

Figure 14:
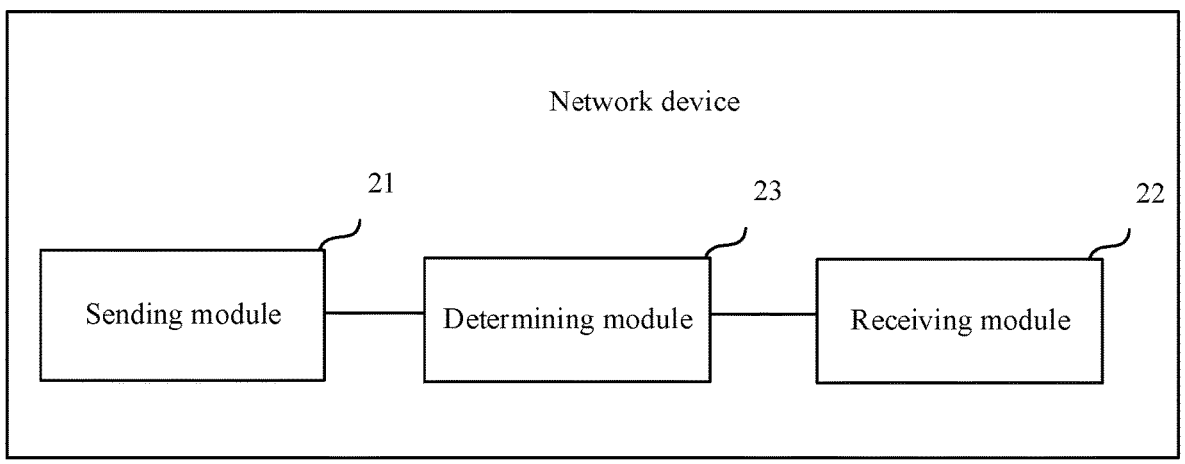
FIG. 14 is a schematic structural diagram of an embodiment of a network device according to this application.

FIG. 14 is schematic structural diagram of an embodiment of a network device according to this application. As shown in FIG. 14, based on the apparatus structure shown in FIG. 13, the apparatus of this embodiment may further include a determining module 23. The determining module 23 is configured to: determine a target PUCCH resource in at least two different PUCCH resources, and determine a type of target UCI based on the target PUCCH resource, where the type of the target UCI includes a first type and a second type, UCI of the first type includes channel state information CSI, and UCI of the second type does not include CSI, or, a quantity of bits of UCI of the first type is within a first preset range, and a quantity of bits of UCI of the second type is within a second preset range.

In one embodiment, the determining module 23 is configured to: determine the type of the target UCI as the first type if UCI triggered by DCI that indicates the target PUCCH resource includes CSI, and/or determine the type of the target UCI as the second type if UCI triggered by DCI that indicates the target PUCCH resource does not include CSI.

In one embodiment, the PUCCH resources indicated by the plurality of pieces of DCI are PUCCH resources in PUCCH resources configured by first configuration information.

Further, the PUCCH resources configured by the first configuration information include at least one first PUCCH resource for carrying UCI that includes CSI and at least one second PUCCH resource for carrying UCI that does not include CSI, and the PUCCH resources indicated by the plurality of pieces of DCI include at least one first PUCCH resource and/or at least one second PUCCH resource.

In this embodiment, the CSI is aperiodic CSI or semi-persistent CSI.

In one embodiment, the receiving module 22 is configured to determine the information bit sequence $a_0, \ldots, a_{A-1}$ of the UCI, where if the type of the target UCI is the first type, a bit sequence $a_{B_1}, \ldots, a_{B_2}$ in the information bit sequence $a_0, \ldots, a_{A-1}$ is an information bit sequence of the CSI, $a_{C_1}, \ldots, a_{C_2}$ is an information bit sequence of the response information, A is a length of the information bit sequence of the target UCI, $A>C2>C1>B2>B1\geq 0$, and A, B1, B2, C1, and C2 are integers.

The apparatus in this embodiment may be configured to execute the technical solutions of the method embodiment shown from FIG. 5 to FIG. 9. The implementation principles and technical effects are similar, and are not further described herein.

Figure 15:
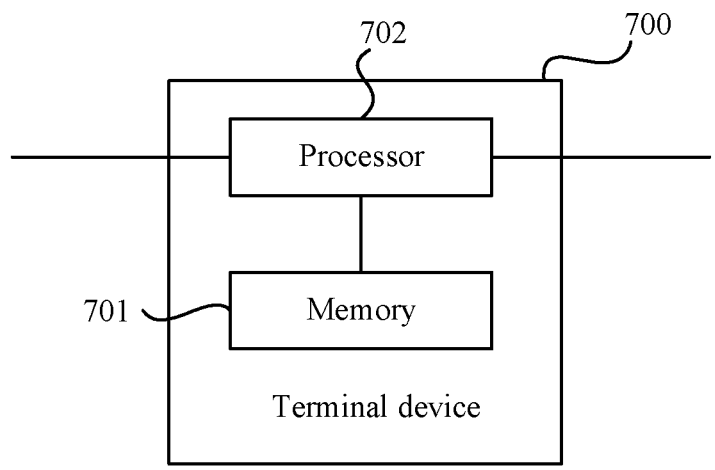
FIG. 15 is a schematic structural diagram of another terminal device according to this application.

FIG. 15 is a schematic structural diagram of another terminal device according to this application. The terminal device 700 includes:

a memory 701, configured to store a program instruction, where the memory 701 may be a flash (flash memory); and a processor 702, configured to invoke and execute the program instruction in the memory, to implement steps in the information transmission method shown in any one of FIG. 5 to FIG. 9. Refer to related descriptions in the foregoing method embodiment for details.

In one embodiment, the memory 701 may be independent or may be integrated with the processor 702.

The terminal device in FIG. 15 may further include a transceiver (not shown), configured to receive and send a signal by using an antenna.

The terminal device may be configured to perform the steps and/or procedures corresponding to the terminal device in the foregoing method embodiment.

Figure 16:
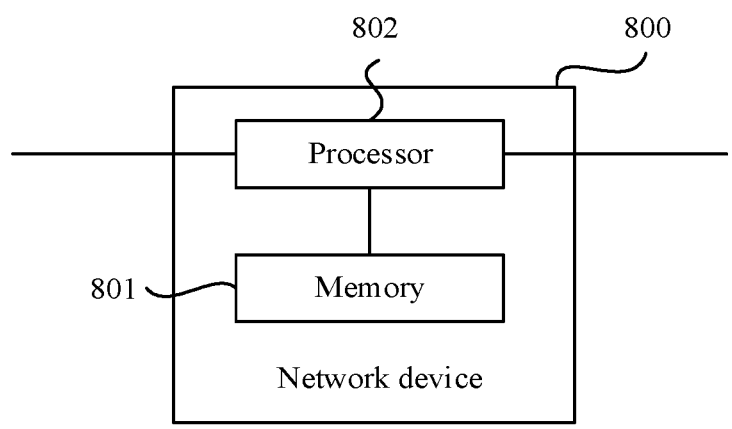
FIG. 16 is a schematic structural diagram of another network device according to this application.

FIG. 16 is a schematic structural diagram of another network device according to this application. The network device 800 includes:

a memory 801, configured to store a program instruction, where the memory 701 may be a flash (flash memory); and a processor 802, configured to invoke and execute the program instruction in the memory, to implement steps in the information transmission method shown in any one of FIG. 5 to FIG. 9. Refer to related descriptions in the foregoing method embodiment for details.

In one embodiment, the memory 801 may be independent or may be integrated with the processor 802.

The network device in FIG. 16 may further include a transceiver (not shown), configured to receive and send a signal by using an antenna.

The network device may be configured to perform the steps and/or procedures corresponding to the network device in the foregoing method embodiment.

This application further provides a readable storage medium. The readable storage medium stores an execution instruction. When at least one processor of a terminal device executes the execution instruction, the terminal device performs the information transmission method in the foregoing method embodiment.

This application further provides a readable storage medium. The readable storage medium stores an execution instruction. When at least one processor of a network device executes the execution instruction, the network device performs the information transmission method in the foregoing method embodiment.

This application further provides a chip. The chip is connected to a memory, or the memory is integrated on the chip. When a software program stored in the memory is executed, the information transmission method in the foregoing method embodiment is implemented.

This application further provides a program product. The program product includes an execution instruction. The execution instruction is stored in a readable storage medium. At least one processor of a terminal device may read the execution instruction from the readable storage medium. The at least one processor executes the execution instruction, so that the terminal device implements the information transmission method in the foregoing method embodiment.

This application further provides a program product. The program product includes an execution instruction. The execution instruction is stored in a readable storage medium. At least one processor of a network device may read the execution instruction from the readable storage medium. The at least one processor executes the execution instruction, so that the network device implements the information transmission method in the foregoing method embodiment.

A person of ordinary skill in the art may understand that all or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. An information transmission method, comprising:
receiving, by a terminal device, a plurality of pieces of downlink control information (DCI), wherein each of the plurality of pieces of DCI is used to trigger reporting of one piece of uplink control information (UCI) and indicate a physical uplink control channel (PUCCH) resource carrying the UCI, wherein the UCI comprises at least one piece of channel state information (CSI) and response information, and wherein PUCCH resources indicated by the plurality of pieces of DCI occupy at least one identical orthogonal frequency division multiplexing (OFDM) symbol, wherein each of the PUCCH resources is an identical PUCCH resource; and
sending, by the terminal device, target UCI on a target PUCCH resource, wherein the target UCI comprises UCI triggered by the plurality of pieces of DCI, and wherein the target PUCCH resource is one of the PUCCH resources indicated by the plurality of pieces of DCI.

2. The method according to claim 1, the sending, by the terminal device, the target UCI on the target PUCCH resource comprises:
sending, by the terminal device, the target UCI and indication information on the target PUCCH resource, wherein the indication information indicates a type of the target UCI,
wherein the type of the target UCI is one of a first type or a second type, wherein UCI of the first type comprises CSI, and UCI of the second type does not comprise CSI, or a quantity of bits of UCI of the first type is within a first preset range, and a quantity of bits of UCI of the second type is within a second preset range.

3. The method according to claim 2, further comprising:
determining, by the terminal device, the type of the target UCI based on the plurality of pieces of DCI; and
determining the type of the target UCI as the first type if one of the plurality of pieces of DCI triggers CSI reporting, or determining the type of the target UCI as the second type if none of the plurality of pieces of DCI triggers CSI reporting.

4. The method according to claim 2, wherein the sending, by the terminal device, the target UCI and indication information on the target PUCCH resource comprises:
sending, by the terminal device, a first information bit sequence on the target PUCCH resource, wherein a bit in at least one preset position in the first information bit sequence is determined based on the indication information, and the first information bit sequence further comprises an information bit sequence of the target UCI.

5. The method according to claim 2, wherein the sending, by the terminal device, the target UCI and indication information on the target PUCCH resource comprises:
determining, by the terminal device, a sequence of a demodulation reference signal (DMRS) of the target PUCCH resource, wherein the sequence of the DMRS is determined based on a first sequence and a second sequence, the first sequence is determined based on the indication information, and the second sequence is determined based on configuration information received by the terminal device.

6. The method according to claim 1, wherein
the target PUCCH resource is a PUCCH resource that carries the largest quantity of encoded bits of the at least two different PUCCH resources; or
the target PUCCH resource is a PUCCH resource indicated by the last DCI of the plurality of pieces of DCI received by the terminal device before the terminal device sends the target UCI; or
the target PUCCH resource is one of PUCCH resources for carrying UCI that comprises at least one piece of CSI.

7. The method according to claim 1, wherein the PUCCH resources indicated by the plurality of pieces of DCI are PUCCH resources in PUCCH resources configured by first configuration information.

8. The method according to claim 7, wherein the PUCCH resources configured by the first configuration information comprise a first PUCCH resource for carrying UCI that comprises CSI and a second PUCCH resource for carrying UCI that does not comprise CSI, and wherein the PUCCH resources indicated by the plurality of pieces of DCI comprise at least one of a first PUCCH resource or a second PUCCH resource.

9. The method according to claim 1, wherein the CSI is aperiodic CSI or semi-persistent CSI.

10. The method according to claim 1, wherein the sending, by the terminal device, the target UCI on a target PUCCH resource comprises:
  determining, by the terminal device, the information bit sequence $a_0, \ldots, a_{A-1}$ of the target UCI, wherein
  when the target UCI comprises CSI and response information, a bit sequence in $a_{B_1}, \ldots, a_{B_2}$ in $a_0, \ldots, a_{A-1}$ is an information bit sequence of the CSI, $a_{C_1}, \ldots, a_{C_2}$ is an information bit sequence of the response information, A is a length of the information bit sequence of the target UCI, A>C2>C1>B2>B1≥0, and A, B1, B2, C1, and C2 are integers; and
  sending, by the terminal device, the information bit sequence on the target PUCCH resource.

11. A terminal device, comprising:
  a receiving module configured to receive a plurality of pieces of downlink control information (DCI), wherein each of the plurality of pieces of DCI is used to trigger reporting of one piece of uplink control information (UCI) and indicate a physical uplink control channel (PUCCH) resource carrying the UCI, wherein the UCI comprises at least one piece of channel state information (CSI) and response information, and wherein PUCCH resources indicated by the plurality of pieces of DCI occupy at least one identical orthogonal frequency division multiplexing (OFDM) symbol, wherein each of the PUCCH resources is an identical PUCCH resource; and
  a sending module configured to send target UCI on a target PUCCH resource, wherein the target UCI comprises UCI triggered by the plurality of pieces of DCI, and the target PUCCH resource is one of the PUCCH resources indicated by the plurality of pieces of DCI.

12. The terminal device according to claim 11, wherein the sending module is configured to:
  send the target UCI and indication information on the target PUCCH resource, wherein the indication information indicates a type of the target UCI,
  wherein the type of the target UCI is one of a first type or a second type, UCI of the first type comprises CSI, and UCI of the second type does not comprise CSI, or a quantity of bits of UCI of the first type is within a first preset range, and a quantity of bits of UCI of the second type is within a second preset range.

13. The terminal device according to claim 12, further comprising:
  a determining module configured to:
  determine the type of the target UCI based on the plurality of pieces of DCI; and
  determine the type of the target UCI as the first type if one of the plurality of pieces of DCI triggers CSI reporting, or determine the type of the target UCI as the second type if none of the plurality of pieces of DCI triggers CSI reporting.

14. The terminal device according to claim 12, wherein the sending module is configured to:
  send a first information bit sequence on the target PUCCH resource, wherein a bit in at least one preset position in the first information bit sequence is determined based on the indication information, and the first information bit sequence further comprises an information bit sequence of the target UCI.

15. The terminal device according to claim 12, wherein the sending module is configured to:
  determine a sequence of a demodulation reference signal (DMRS) of the target PUCCH resource, wherein the sequence of the DMRS is determined based on a first sequence and a second sequence, wherein the first sequence is determined based on the indication information, and the second sequence is determined based on configuration information received by the terminal device.

16. The terminal device according to claim 11, wherein
  the target PUCCH resource is a PUCCH resource that can carry the largest quantity of encoded bits of the at least two different PUCCH resources; or
  the target PUCCH resource is a PUCCH resource indicated by the last DCI of the plurality of pieces of DCI received by the terminal device before the terminal device sends the target UCI; or
  the target PUCCH resource is one of PUCCH resources for carrying UCI that comprises at least one piece of CSI.

17. The terminal device according to claim 11, wherein the PUCCH resources indicated by the plurality of pieces of DCI are PUCCH resources in PUCCH resources configured by first configuration information.

18. A non-transitory machine-readable medium having instructions stored therein, which when executed by a processor, cause the processor to perform operations comprising:
  receiving, by a terminal device, a plurality of pieces of downlink control information (DCI), wherein each of the plurality of pieces of DCI is used to trigger reporting of one piece of uplink control information (UCI) and indicate a physical uplink control channel (PUCCH) resource carrying the UCI, wherein the UCI comprises at least one piece of channel state information (CSI) and response information, and wherein PUCCH resources indicated by the plurality of pieces of DCI occupy at least one identical orthogonal frequency division multiplexing (OFDM) symbol, wherein each of the PUCCH resources is an identical PUCCH resource; and
  sending, by the terminal device, target UCI on a target PUCCH resource, wherein the target UCI comprises UCI triggered by the plurality of pieces of DCI, and wherein the target PUCCH resource is one of the PUCCH resources indicated by the plurality of pieces of DCI.

19. The non-transitory machine-readable medium of claim 18, wherein the sending, by the terminal device, target UCI on a target PUCCH resource comprises:
  sending, by the terminal device, the target UCI and indication information on the target PUCCH resource, wherein the indication information is used to indicate a type of the target UCI,
  wherein the type of the target UCI comprises a first type and a second type, UCI of the first type comprises channel state information CSI, and UCI of the second type does not comprise CSI or a quantity of bits of UCI of the first type is within a first preset range, and a quantity of bits of UCI of the second type is within a second preset range.

20. The non-transitory machine-readable medium of claim 19, the operations further comprising:
   determining, by the terminal device, the type of the target UCI based on the plurality of pieces of DCI; and
   determining the type of the target UCI as the first type if one of the plurality of pieces of DCI triggers CSI reporting, and/or determining the type of the target UCI as the second type if none of the plurality of pieces of DCI triggers CSI reporting.

* * * * *